US012792420B2

(12) United States Patent
Wilson et al.

(10) Patent No.: US 12,792,420 B2

(45) Date of Patent: Nov. 10, 2026

(54) CAPACITY CLUSTER RESOURCE RESERVATIONS IN A CLOUD PROVIDER NETWORK

(71) Applicant: Amazon Technologies, Inc., Seattle, WA (US)

(72) Inventors: Darren Edward Wilson, Vienna, VA (US); Mahadev Vagvala, Redmond, WA (US); Kerem Bulbul, Seattle, WA (US); Subramanian Pranesh Ramalingam, Sammamish, WA (US); Jacob Anthony Siddall, Oakland, CA (US); Lee Ann Hilda Akinde, Seattle, WA (US); Khanh Ngoc Han Huynh, Seattle, WA (US); Elton Victor Pinto, Seattle, WA (US); Laxman Kasyap Kolipaka, Kirkland, WA (US); Bahman Naderi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 420 days.

(21) Appl. No.: 18/497,806

(22) Filed: Oct. 30, 2023

(65) Prior Publication Data

US 2025/0138901 A1 May 1, 2025

(51) Int. Cl.
*G06F 16/00* (2019.01)
*G06F 9/50* (2006.01)

(52) U.S. Cl.
CPC .......... *G06F 9/5072* (2013.01); *G06F 9/5038* (2013.01); *G06F 9/5044* (2013.01)

(58) Field of Classification Search
CPC .... G06F 9/5072; G06F 9/5038; G06F 9/5044; G06F 9/4843; G06F 2209/5014; G06F 2209/5019; G06F 2209/503; G06F 9/4881; G06F 9/5033; H04L 67/62; H04L 67/10
See application file for complete search history.

(56) References Cited

U.S. PATENT DOCUMENTS

| | | | | |
|---|---|---|---|---|
| 8,739,170 | B1 | 5/2014 | Gupta et al. | |
| 10,761,875 | B1 * | 9/2020 | Burgin | G06F 9/485 |
| 10,877,796 | B1 * | 12/2020 | Kinney, Jr. | G06F 9/4881 |
| 10,970,113 | B1 * | 4/2021 | Kurtzer | G06F 9/5005 |
| 11,294,604 | B1 | 4/2022 | Mcmullan et al. | |

(Continued)

OTHER PUBLICATIONS

Notice of Allowance, U.S. Appl. No. 18/497,817, Nov. 6, 2024, 8 pages.

(Continued)

*Primary Examiner* — Alexander Khong
(74) *Attorney, Agent, or Firm* — Nicholson DeVos Webster & Elliott LLP

(57) ABSTRACT

Techniques for implementing and utilizing capacity cluster resource reservations are described. A managed compute service receives a user's request to identify a capacity block for use in launching compute instances. A schedule with pre-computed blocks, each corresponding to an amount of instances and an amount of time, is used to identify a block satisfying the request's criteria. The user can later obtain the capacity block and launch instances into the reservation during its time window, where placement rules associated with the reservation ensure the instances are hosted in locations enabling low-latency intercommunications.

20 Claims, 16 Drawing Sheets

(56) References Cited

U.S. PATENT DOCUMENTS

| | | | | |
|---|---|---|---|---|
| 2007/0094665 | A1* | 4/2007 | Jackson | G06F 9/5072 718/104 |
| 2015/0235156 | A1* | 8/2015 | Dasari | G06Q 10/06314 705/7.24 |
| 2019/0146850 | A1 | 5/2019 | Quinn et al. | |
| 2019/0339959 | A1 | 11/2019 | Saha et al. | |
| 2020/0301741 | A1* | 9/2020 | Gabrielson | G06N 3/0442 |
| 2021/0406133 | A1 | 12/2021 | Shemer et al. | |
| 2022/0179754 | A1 | 6/2022 | Luan et al. | |
| 2023/0236896 | A1* | 7/2023 | Wang | G06F 9/5044 718/104 |

OTHER PUBLICATIONS

Non-Final Office Action, U.S. Appl. No. 18/497,812, Mar. 13, 2025, 6 pages.
International Search Report and Written Opinion, PCT App. No. PCT/US2024/052629, Feb. 5, 2025,13 pages.
Non-Final Office Action, U.S. Appl. No. 18/497,817, Jun. 6, 2024, 16 pages.

* cited by examiner

600

```
describe-capacity-block-offerings
[--dry-run <boolean>]
--instance-type <value> (string)
--instance-count <value> (int)
--capacity-duration-hours (int)
[--start-date-range <value>] (timestamp)
[--end-date-range <value>] (timestamp)
[--max-results <value>] (int)
[--next-token <value>] (int)
```

610

```
describe-capacity-block-offerings \
--instance-type gpu-super.48xlarge \
--instance-count 16 \
--capacity-duration-hours 48 \
--start-date-range 2023-08-014T00:00:00Z \
--end-date-range 2023-10-22T00:00:00Z
```

620

```
{
    "CapacityBlockOfferings": [
        {
            "OfferingId": "cb-0123456789abcdefg",
            "InstanceType": "gpu-super.48xlarge",
            "AvailabilityZone": "usa-east-1",
            "InstanceCount": "16",
            "StartDate": "2023-08-15T12:00:00Z",
            "EndDate": "2023-08-19T12:00:00Z",
            "CapacityDurationHours": "48",
            "TotalUpfrontPrice": "40320.00",
            "InstanceHourlyRate": "52.50",
            "CurrencyCode": "USD",
        }
   ]
}
```

*FIG. 6*

700

```
purchase-capacity-block
[--dry-run <boolean>]
[--client-token <value>] (client token)
[--tag-specifications <value>] (tag specification list)
--capacity-block-offering-id <value> (string)
--instance-platform <value> (string)
```

710

```
purchase-capacity-block \
--capacity-block-offering-id cb-0123456789abcdefg \
--instance-platform "Linux/UNIX"
```

720

```
{
    "CapacityBlock": {
        "CapacityBlockId": "cr-a1234567",
        "EndDateType": "limited",
        "ReservationType": "capacity-block",
        "AvailabilityZone": "europe-east-1",
        "InstanceMatchCriteria": "targeted",
        "EphemeralStorage": false,
        "CreateDate": "2023-07-29T14:22:45Z ",
        "StartDate": "2023-08-15T12:00:00Z",
        "EndDate": "2023-08-19T12:00:00Z",
        "AvailableInstanceCount": 0,
        "InstancePlatform": "Linux/UNIX",
        "TotalInstanceCount": 16,
        "State": "payment-pending",
        "Tenancy": "default",
        "BlockStorageServiceOptimized": true,
        "InstanceType": "gpu-v2.48xlarge"
    }
}
```

*FIG. 7*

CAPACITY CLUSTER RESOURCE RESERVATIONS IN A CLOUD PROVIDER NETWORK

BACKGROUND

High-Performance Computing (HPC) and Machine Learning (ML) applications increasingly rely on parallel computing due to the growing complexity of computations and the need for faster and more efficient processing. Parallel computing is a paradigm where multiple tasks or processes are executed simultaneously to solve a larger problem. This plays a crucial role in both HPC and ML for several reasons.

First, these applications have massive data and computation demands. Many HPC applications, such as scientific simulations, weather forecasting, and molecular modeling, generate vast amounts of data and require extensive calculations. Parallelism allows these applications to process data and perform computations in a timely manner. ML applications, such as neural networks having millions of parameters, require extensive training on large datasets. Parallelism accelerates training by distributing computations across multiple processing units.

By breaking down a problem into smaller tasks that can be solved simultaneously, HPC and ML applications can achieve substantial speedup using such distributed processing techniques.

Parallel computing is thus essential for many HPC and ML applications due to the need to process massive amounts of data and perform complex computations quickly and efficiently. The combination of hardware advancements, specialized algorithms, and distributed computing frameworks can enable researchers and practitioners to harness the power of parallelism for solving challenging problems such domains. However, implementing effective and efficient distributed computing in practice can be extremely difficult in real world environments.

BRIEF DESCRIPTION OF DRAWINGS

Various examples in accordance with the present disclosure will be described with reference to the drawings, in which:

FIG. 6 is a diagram illustrating an exemplary request format, request, and response for describing capacity block offerings according to some examples.

FIG. 7 is a diagram illustrating an exemplary request format, request, and response for obtaining capacity blocks according to some examples.

DETAILED DESCRIPTION

Figure 1:
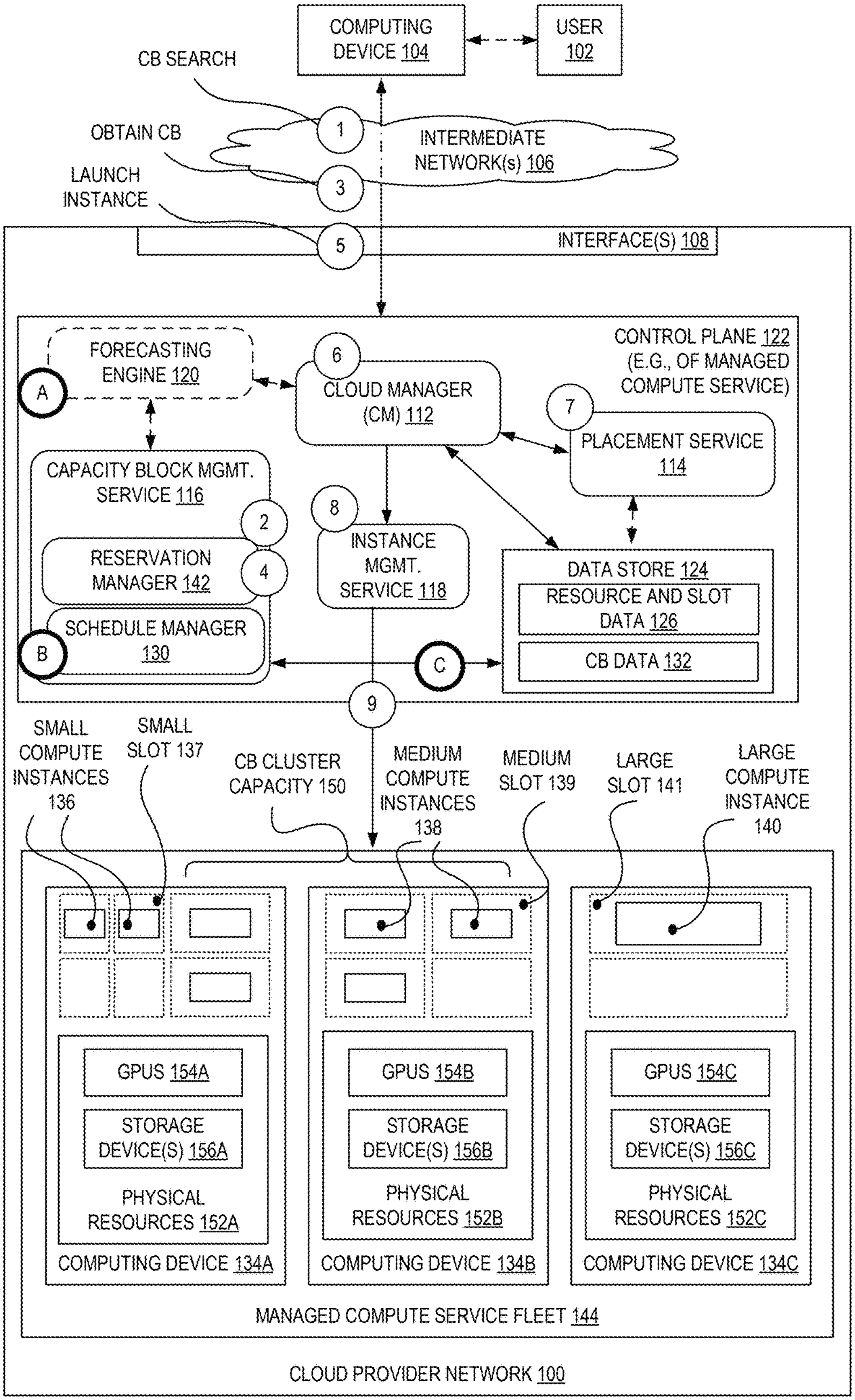
FIG. 1 is a diagram illustrating an environment for implementing and utilizing capacity cluster resource reservations in a cloud provider network according to some examples.

The present disclosure relates to methods, apparatus, systems, and non-transitory computer-readable storage media for implementing and utilizing capacity cluster resource reservations in a cloud provider network. According to some examples, a hardware virtualization service is adapted to provide capacity blocks, or "CBs" (also referred to as "capacity block reservations" or "CBRs"), that provide users of all sizes and industries with assured and predictable access to graphics processing units (GPUs) enabled instances to run machine learning (ML), high-performance computing (HPC), and other types of workloads benefitting from distributed, GPU-enabled computing. In some examples, users can reserve a block of GPU time for the cluster size and duration they choose via a CB, avoiding time wasted searching for the GPUs they need to run ML workloads. Users can use CBs to plan their AI development cycles with confidence knowing that they will have access to the GPUs they need on a specific date for the particular amount of time they reserve, without the need for long-term commitments.

With recent advancements in ML technologies, users across industries are applying artificial intelligence (AI) via the use of ML models to solve increasingly complex problems. However, access to GPUs has become a major obstacle that is impeding progress for many users attempting to develop AI applications. The growth in demand for GPU capacity to train AI models has outpaced supply, making GPUs a scarce resource across the world. Due to this combination of significantly increased demand together with a GPU supply shortage, many users face uncertainty in terms of getting access to GPUs to train their ML models. For example, users could commit to long-term usage plans to ensure reliable access to GPU capacity or simply reserve compute capacity for indefinite periods of time, but this is both wasteful of compute resources (as they may often sit idle during these periods) and prohibitively expensive for many users, who may only need access to a GPU cluster to run a set of experimentation or developmental workloads for a few days or weeks. This challenge is further exacerbated by the increasing number of GPUs that are needed to train large AI models, which need to be connected via a low-latency, high-bandwidth network, making it nearly impossible to scale up all the GPUs needed to run a workload on demand.

In some examples, users can search for available blocks of GPU capacity across a range of dates and can schedule a reservation for a block of time that works best for their needs. When the reservation starts, users are assured that they can provision their entire GPU cluster all at once, enabling them to immediately kick off their workload. When the reservation ends, the hardware virtualization service can take the capacity back to ensure it is available for the next reservation. In some examples, the clusters are made up of GPU-enabled compute instances that are purposefully placed within the cloud provider network's infrastructure in a manner such that they ensure enhanced interconnectivity between the instances, allowing the computation functionality (e.g., GPU processing for ML tasks) and also the communication resources (e.g., low-latency intercommunication) needed for such jobs.

Additionally, aspects of the present disclosure relate to methods, apparatus, systems, and non-transitory computer-readable storage media for utilizing auxiliary compute instances in a cloud provider network. According to some examples, a managed compute service—such as a hardware virtualization service—can launch and utilize auxiliary compute instances within a same slot where a user's compute instance will be placed, or was placed, to optimize the startup, use, and/or termination of customer instances.

In some examples, an auxiliary compute instance can be rapidly launched prior to the launch of a user-desired compute instance to pre-warm a local computing resource for the user compute instance. For example, in some examples an auxiliary compute instance can obtain data needed by the user compute instance (and/or to launch the user compute instance) prior to its need and store this data in a host-local storage device. Thereafter, this host-local storage device can be directly and quickly utilized by the user compute instance, instead of requiring the compute instance to obtain this data itself, typically from a remote storage location or service, which may be located off-device, potentially many network hops away. In one example, the auxiliary compute instance obtains data for a network-backed disk volume (e.g., by retrieving this data over the network) which may be used as a "boot volume" (by the user compute instance) and persists it to a non-volatile storage device, thus enabling a "local boot" of the user compute instance via this local data. By using an "auxiliary" instance (also referred to as an auxiliary domain), which includes file system level functionalities, such file-level data can be accessed and stored in a way that is more directly accessible to the user compute instance, which also may operate at a file level.

In some examples, an auxiliary compute instance can be rapidly launched during the termination of a user compute instance to more rapidly or efficiently "clean up" the execution slot used by the user compute instance, and the user instance-utilized local computing resources, ensuring security for the user in that their data is effectively removed and that the local computing resources remain fully functional and/or are reset for a next use. For example, upon a user terminating a compute instance, an auxiliary compute instance can be rapidly launched in a same slot as used by the user instance, which can be used to perform "clean up" operations such as resetting user-modifiable configuration values of a local resource (e.g., settings of a GPU), performing tests of the local resource to ensure its functionality (e.g., testing functions of GPUs, which can occasionally fail), and the like. Due to the relative speed of this auxiliary instance usage, such post-use "clean-up" and/or "verification" processes can be quickly and efficiently performed with minimal overhead that would otherwise typically be incurred in large-scale computing environments such as multi-tenant cloud provider networks. Moreover, in some examples this speed allows the auxiliary instance to be launched, used, and shutdown during the time in which the original user's instance remains in a "shutting down" state, preventing the user from encountering "insufficient capacity" scenarios should the user otherwise attempt to rapidly launch another instance while their original instance slot is still being cleaned.

FIG. 1 is a diagram illustrating an environment for implementing and utilizing capacity cluster resource reservations in a cloud provider network according to some examples. In some examples, a control plane 122 (e.g., of a managed compute service, such as a hardware virtualization service) includes a capacity block management service 116, or "CBMS," that allows its users with the ability to find and obtain capacity blocks, which provide users with a desired cluster of compute instances (e.g., having GPU functionality) during a specified time window of the user's choosing. The control plane 122 and its associated services, data stores, and the like, are typically implemented as software executed by one or more (and typically, many) computing devices that may be located in one or multiple locations of a cloud provider network 100.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers", such as user 102) of cloud provider networks 100 can use one or more user accounts that are associated with a customer account, though these terms can be used somewhat interchangeably depending upon the context of use. Cloud provider networks are typically "multi-tenant" as they can provide services to multiple different customers using the same physical computing infrastructure.

Users, via use of a client such as software executed by a computing device 104, can interact with a cloud provider network 100 across one or more intermediate networks 106 (e.g., the internet) via one or more interface(s) 108, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a cloud provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

For example, as shown in FIG. 1, a control plane 122 (e.g., for a managed compute service) includes a variety of components (e.g., services, data stores, and the like) that perform management functions and are typically implemented on a separate set of hardware computing devices than those more directly providing "data plane" functionality, such as the managed compute service fleet 144 of computing devices 134 (e.g., computing devices 134A-134C) that can host customer compute instances. In some examples, these computing devices 134A-134C include local physical resources 152, such as GPUs 154, storage devices 156 (e.g., non-volatile storage such as SSDs, magnetic disk drives, or the like), machine learning accelerators (e.g., special-purpose processors optimized for machine learning training and/or inference tasks), field-programmable gate arrays (FPGAs), etc., which can be utilized by ones of the compute instances executed by the respective computing device.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a VM that can execute on "bare metal" hardware without an underlying hypervisor but perhaps be supported by functionality implemented in a separate offload card discussed later herein), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not directly available to user instances, but rather are dedicated to instance management tasks such as virtual machine management (e.g., a hypervisor), input/output (I/O) virtualization to network-attached storage volumes, local migration management tasks, instance health monitoring, and the like). Virtual machines are commonly referred to as compute instances or simply "instances." As used herein, provisioning or hosting a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, a fleet 144 of computing devices 134 can be used within a cloud provider network 100 to host compute instances 136/138/140 for users 102. As indicated herein, in large-scale cloud provider networks, a common approach to providing computing resources in the form of compute instance execution (e.g., executing virtual machine (VM) instances and/or containers) involves allowing customers to launch particular "types" of compute instances.

For example, multiple instance families may be provided that are optimized to accommodate different use cases. An instance family may provide a varying combination of processing, memory, storage, networking, etc., capacity or capabilities to allow the customers of the provider network the flexibility to choose an appropriate mix of resources for their needs. By way of example, one instance family may be "compute optimized" in that those instances offer comparatively different or "better" processing functionality compared to others, while another instance family may be "general purpose" and offer amounts of processing, memory, and network capabilities that are well-suited to many types of workloads, while another instance family may be "graphics intensive" (e.g., providing additional processing and/or memory functionalities, and/or access to additional resources such as GPUs or the like) and another could be "storage optimized."

Further, each instance family may include a number of different instance "sizes" having different amounts or characteristics of the particular resources of the compute instance, allowing customers to scale their resources as needed. For example, a "2xlarge" size of instance in a family could provide double the amount of one or more resources (e.g., double the processing and/or memory) as a "large" size instance in the family.

Thus, an "instance type" may correspond to a particular configuration of resources of a compute instance and be a combination of an instance family (e.g., a processing-optimized compute instance) and a particular size (e.g., a particular amount of processing, memory, storage, networking, etc.) of the family.

In FIG. 1, three host computing devices 134A-134C are illustrated, though in large-scale provider networks 100 there may be hundreds, thousands, tens of thousands, or more computing devices 134, which may be located in multiple geographic locations. Additionally, in this example, three different compute instance types—referred hereto as small, medium, and large—are presented, though in provider networks 100 there may be significantly more or even fewer types of compute instance types utilized.

In some examples, the execution of compute instances is managed via the use of slots, e.g., small slots 137, medium slots 139, large slots 141. A slot can be a conceptual representation of a specific subset of computing related resources provided by a computing device, which can be used to host instances of a particular instance type (or set thereof). As shown in FIG. 1, computing device 134A may be associated with four small slots 137 and two medium slots 139, whereas computing device 134C may be associated with two large slots 141. In some cases, the computing devices may be deployed in a homogeneous environment in which only one type of slot is associated with a particular computing device; however, as shown, in other examples different types of slots can be associated with a single computing device at a particular point in time. Thus, a computing device may host one type of compute instance at a time, or potentially multiple types of compute instances at a time.

Slots may be tracked by control plane 122 via resource and slot data 126 stored in a data store 124 of the control plane 122. For example, this resource and slot data 126 may include, for a slot, a resource vector that identifies a specific set of resources in a host electronic device upon which a compute instance is to be placed. A resource vector may include identifiers of particular CPUs/vCPUs, amounts or specific ranges of memory, specific storage devices or locations, specific accelerators or GPUs, or the like, that will be dedicated to particular instances that may be executed or hosted in that slot. In some examples, these slots (and resource vectors) are laid out in a manner to ensure high performance for instances using the slots.

As an example, consider an electronic device with two non-uniform memory access (NUMA) nodes (e.g., "slices" of processing capability with memory having a same rate of connectivity)—"N1" and "N2"—and 2 terabytes (TB) of hard disk. From this configuration, the following are a few simplified examples of resource vectors: <N1, 0-1 TB>, <N2, 1-2 TB>, and <{N1, N2}, 0-2 TB>. As another example, a resource vector could include NUMA node identifiers, processing capabilities, and memory; as another example a resource vector could include (e.g., in addition to processing and/or memory) a number of firewall rules associated with the compute instance and/or the electronic device, an amount of available bandwidth, an amount of available networking "burst", an identifier of associated graphics processing units (GPUs) and/or accelerator devices (e.g., a fraction of whole, or an address range), an amount of persistent storage, a bandwidth for writing/reading to disk, etc. A resource vector can be represented in a variety of different types of formats, e.g., as JavaScript Object Notation (JSON), Extensible Markup Language (XML), etc.

In some examples, the control plane 122 can manage its available compute instance capacity by reconfiguring ones of the electronic devices 134A-134C. For example, a control plane 122 includes a forecasting engine 120 that, based on analysis of a previous utilization history of compute instances of the provider network 100, may construct models indicating what types of compute instances may be desired by customers at particular times. Thus, a forecasting engine 120 may obtain data describing previous compute instance utilization over time—e.g., when requests to launch compute instances were received, what types of compute instances were sought by those requests, when compute instances were launched, what types of compute instances where launched, how long the compute instances were used, etc., and generate a statistical and/or machine learning model for predicting future capacity needs. A cloud manager 112 (or "CM") can thus use a generated model (hosted by the forecasting engine 120) to generate forecast data comprising "pool targets" that indicate how many compute instances of certain types are predicted to be needed at a time in the immediate or near future, and thereafter invoke a fleet reconfiguration engine to build, re-allocate, and manage the multiple different types of "slots" of free pools of capacity.

For example, a new slot can be created by registering a slot data structure (e.g., in resource and slot data 126 in data store 124), which may include resource vector type information (e.g., identifying an instance type supported by the slot, specific resources used for the slot, etc.), an identifier of the associated computing device hosting the slot, supporting metadata such as a location of the computing device within the provider network, or the like. Slot reconfiguration can similarly occur by updating existing slot data structures for existing slots, removing existing data structures and replacing them with new slot data structures, and the like. This functionality may be invoked by entities within the control plane 122, such as the CBMS 116, by sending a control plane type request to another entity that performs the updates to the data store 124 (e.g., to the cloud manager 112). In some examples, replacing one or more existing slots with one or more new slots can be performed as a single transactional operation, and thus either both of these updates will be performed or neither will be performed (in the event of some failure).

In some examples, the CM 112 can take into account characteristics of the slots when determining if and how the slots can be reconfigured. For example, in some embodiments, NUMA boundaries can be accounted for, e.g., slots at different NUMA nodes, in some scenarios, might not be combined to form a "larger" slot. Thus, some examples may not attempt to "create" a potential slot that spans across NUMA nodes, which could lead to decreased performance for a compute instance that would be placed at such a slot. In some embodiments, other computer architecture features can similarly be taken into account when determining how slots can be reconfigured. For example, a particular storage or memory (e.g., an L2 cache and/or L3 cache, or section thereof, memory bank, etc.) may be associated with a particular slot, and thus in some scenarios two slots that are associated with different memory locations (e.g., caches) may potentially not be combined to yield a different type of slot. Thus, some examples can utilize a reconfiguration process that creates slots having optimal architecture to support particular types of compute instances. In some embodiments, such reconfigurations may include first ensuring that NUMA boundaries are honored as described above, and then attempting to find slots having processors that share cache lines, etc.

In some examples, to provide capacity blocks, the CBMS 116 generates a schedule of available blocks from which to choose from for servicing user requests. For example, the CBMS 116 creates various "blocks"—e.g., corresponding to a number of compute instances, for a particular amount of time—and places them on a schedule, ensuring that available slot capacity is not overcommitted in the future.

In some examples, the CBMS 116 pre-computes a variety of block sizes that are available at specific times for users to purchase, which makes up a schedule. For example, on a particular date (e.g., October 31) the CBMS 116 may allocate 20% of available slots starting on that date to 64-instance×14-day blocks, 15% to 32-instance×7-day blocks, etc. The pre-computed schedule can be designed to reflect the distribution of block demand expected from users of the service. Over time, the distribution can be fine-tuned/updated as new blocks are added onto the schedule, e.g., at an eight-week reservation book horizon.

In some examples, pre-sized slots can be added to the end of the schedule (e.g., an eight-week schedule) each day. In some examples, the time that blocks are added to the schedule can be randomized to prevent fraudulent use of the system, e.g., automated clients that seek to obtain as many blocks as possible as soon as they're added. As pre-sized slots may have a range of durations, the entire pool will not be added each day. For example, if a 64-instance×14-day slot is added on a Monday, those instance slots will be consumed by that block for the next two weeks. In some examples, shorter-duration slots may still be added to the schedule during those two weeks, however.

Turning to FIG. 1, as shown with regard to circle (A), forecasting engine 120 may periodically generate demand forecasts for various blocks (e.g., instance count, duration pairs) for one or multiple instance types. This generation may be based on previous usage, previous requests, and the like. For example, specific details from a collection of requests (seeking a description or listing of CB availability) over a period of time can be gathered and used to train a machine learning type model so that the model can generate predictions for future periods of time. Alternatively, other modeling methods (e.g., statistical techniques) known to those of skill in the art can similarly be used for generating forecasts.

These forecasts can be provided to the CBMS 116 and used by a schedule manager 130 component at circle (B) to update the CB availability schedule, which can be stored as part of CB data 132 in a data store 124 (e.g., a database, a set of files, or the like) at circle (C).

For example, data summarizing the collection of daily, weekly, etc., requests for CB resources can be collected for a variety of requested block "shapes" (e.g., different combinations of instance count and duration). It may be the case that within a next week (or other time unit) the service may expect to see one hundred requests for a first block shape (e.g., 16 instances for 5 days) and expect to see two hundred requests for a second block shape (e.g., 32 instances for 10 days), for a particular instance type. The schedule manager 130 then uses a scheduling algorithm to use up the available capacity placing creating blocks on the schedule, based on this forecast data, in a manner that uses as much of the capacity as possible. This placement of blocks can be made based on the forecasts in a variety of ways, such as by adding a block onto the schedule for different shapes one at a time, and stopping adding blocks of a particular shape once a sufficient number of blocks for that shape have been added that satisfies the forecast. In other examples, blocks can be added in a more proportional manner, e.g., because double the requests are expected for the second block shape compared to that expected for the first block shape, two blocks for that shape can be added to the schedule for every block of the first shape, until the forecast is met or capacity is exhausted.

In some examples, this pre-computation of blocks for the schedule can be made based on locations of the associated slots where instances for the reservations will be. Thus, the schedule manager 130 may only generate blocks where the underlying slots satisfy some performance criteria—e.g., they will provide sufficient networking capabilities, such as ensuring low latency communication, high-throughput communication, or the like. This can be implemented in a variety of ways, such as not spreading blocks across some border of the provider network's architecture—e.g., a block must lie on a same network portion (e.g., a spine of the network, or within some aggregation of the network). By considering the locations of the capacity when generating blocks, the system can ensure superior performance for its users.

Figure 2:
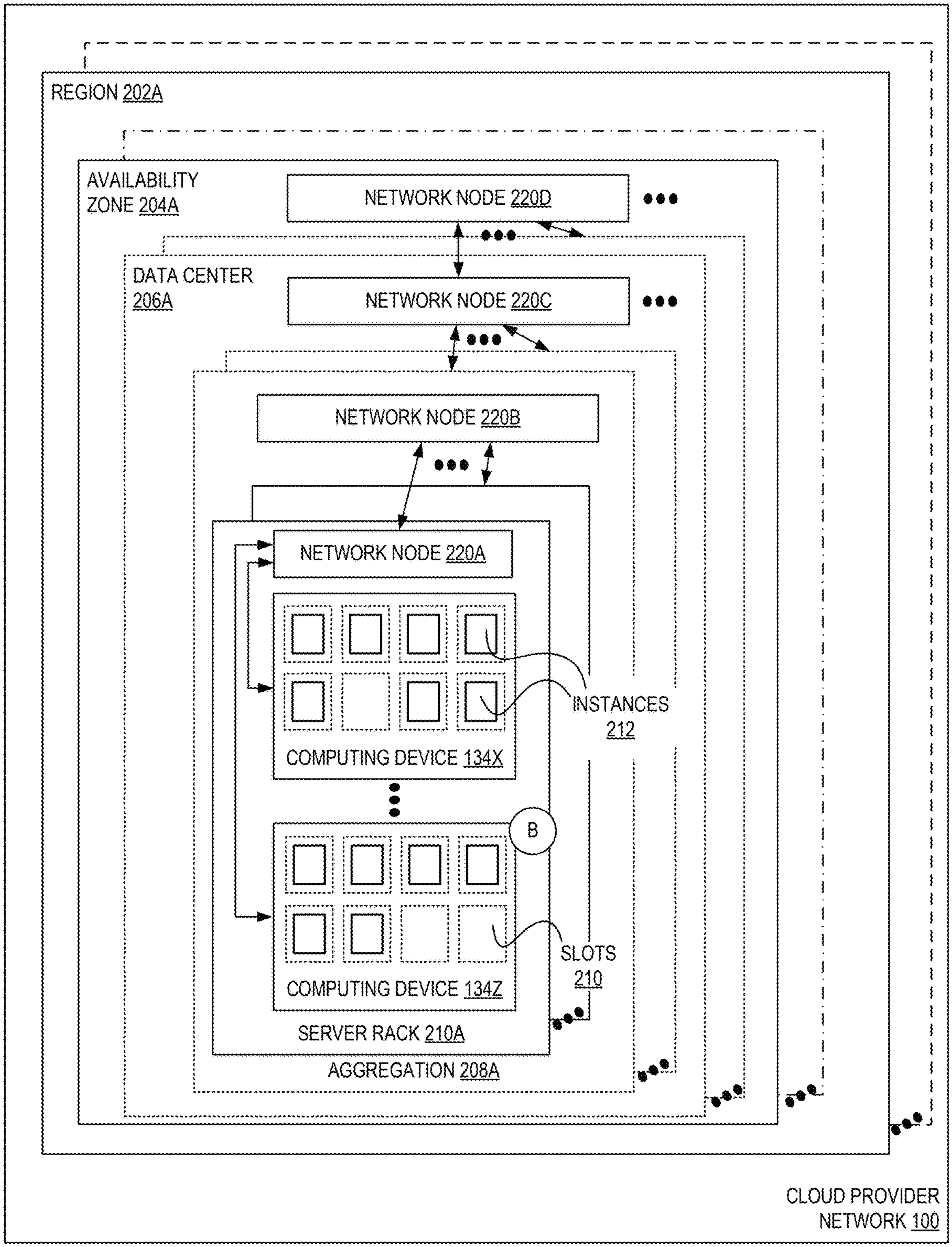
FIG. 2 is a diagram illustrating architectural aspects of an exemplary cloud provider network useful for implementing and utilizing capacity cluster resource reservations according to some examples.

For example, FIG. 2 is a diagram illustrating architectural aspects of an exemplary cloud provider network useful for implementing and utilizing capacity cluster resource reservations according to some examples.

A cloud provider network 100 can be formed as a number of regions 202, where a region 202A is a geographical area in which the cloud provider clusters data centers. Each region includes multiple (e.g., two or more) availability zones (AZs) 204 connected to one another via a private high-speed network, for example a fiber communication connection. An AZ (also known as a "zone") provides an isolated failure domain including one or more data center 206 facilities with separate power, separate networking, and separate cooling from those in another AZ. A data center 206A refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Within a data center 206A, many computing devices 134 for hosting user instances may be arranged in a network hierarchy, e.g., instances 212, which execute in slots 210 of a computing device 134, may communicate with another within the computing device itself (e.g., without using external network components), or communicate between computing instances 212 on a same server rack 210A via a network node 220A (e.g., a Top of Rack, or ToR, switch). Instances on different racks 210A may need to further communicate via both the network node 220A and other network nodes, e.g., network node 220B (e.g., a switch that is coupled to multiple ToR type switches, thus forming an aggregation 208A), optionally via another network node 220C (e.g., a switch for a "spine" of the network) above it in the hierarchy, optionally via yet another network node 220D in the hierarchy, or the like.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A cloud provider network can include a physical network (e.g., sheet metal boxes, cables, server racks 210) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host (e.g., computing devices 134X-134Z) can have an IP address in the substrate network. Hardware virtualization technology can enable multiple operating systems to run concurrently on a host computer, for example as VMs on the host computing device. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints. In some cases, the functionality provided by a VMM may instead be provided by a separate offload card described herein, freeing up the main CPU(s) for use by the compute instances 212 themselves.

Turning back to FIG. 1, given a set of capacity (e.g., obtained from the resource and slot data 126) that can be used for hosting instances as part of CBs, the schedule manager 130 creates a schedule of blocks for CBs, and may periodically update the schedule by adding new blocks, reconfiguring blocks (such as when un-used blocks are no longer desired, or are needed less, per the forecasting data), and the like. As indicated, the schedule manager 130 can take into account the particular locations of where the instances of the CB will be, and ensure that CBs will intercommunicate in a way that is appropriate for such tasks—e.g., all slots for a CB must be within a same server rack, or aggregation, or on a same network spine, or in a same data center, or the like.

In other examples, however, blocks may not need to be pre-placed on a schedule. Instead, upon receiving requests for capacity, the CBMS 116 could attempt to dynamically determine if a particular block could be obtained based on examining existing block reservations and determining whether free capacity exists that would satisfy a requested block shape. However, this approach can potentially lead to additional "wasted" capacity through small, odd-shaped portions of capacity being unused.

As indicated herein, users 102 can use an interface 108 (e.g., an API call, a request made via a console application, etc.) to search for a CB to suit their needs. This can include transmitting a search request, as reflected by circle (1), to the control plane 122. One example search request described later herein is referred to as a "describe capacity block offerings" request, though other names can be used, such as "describe capacity block offerings" or "list capacity block offerings" or the like. With this request, a user can specify requirements or preferences for a CB that they desire, such as a number of instances, a type of instances, an amount of time the instances are needed for, desired timing information (e.g., an earliest start date, a latest ending date), a preferred location (e.g., a region or AZ of the provider network), or the like.

This request is provided to the CBMS 116 and passed on to a reservation manager 142, which, at circle (2), consults the schedule and the associated CB recordkeeping (in CB data 132) indicative of which blocks remain available to determine whether any block or blocks on the schedule is free and satisfies the request. In response to the request, information describing any matching block (or blocks) can be provided back to the client (here, executed by computing device 104), together with a capacity block identifier associated with each block. If no such blocks satisfy the requested requirements, notice of this non-match can be provided back as well. Alternatively, or additionally, in some examples the reservation manager 142 may transmit a message to the schedule manager 130 to determine whether such a block could be created (e.g., based on eliminating other un-used blocks, using additional capacity, or the like), which the schedule manager 130 could perform and return the details of the new block back to the reservation manager 142, which is then provided back to the client.

In some examples, the CBMS 116 can be configured to allow users to find and/or purchase CBs without needing to reveal the full scope of blocks available on the schedule, which can ensure fairness, prevent gamesmanship, and the like. For example, in some cases the CBMS 116 is configured to enforce a limit on the number of "describe" or "purchase" capacity block requests that can be originated from a particular account (or set of accounts), e.g., by allowing only up to one call per second (or the like). As another example, in some cases the CBMS 116 is configured to only provide a threshold number of CB "offerings" over a unit time for an account, such as ten offerings per hour. In some such cases, previously provided "offerings" may be cached and provided back responsive to subsequent similar requests (when the threshold has been passed).

The CBMS 116 can also be configured, in some examples, to prevent individual users or organizations from obtaining an "unfair" (according to some desired standard) amount of capacity blocks. For example, the CBMS 116 may prevent an offering from being purchased if the user's account already has (or would exceed) a threshold number of instances in CBs at a particular point in time. For example, the CBMS 116 may allow any user to have a maximum of sixty-four instances active across one or more CBs at any point in time.

Alternatively, or additionally, the reservation manager 142 could also attempt to find other blocks that are similar to what is requested, or blocks that satisfy some but not all of the requested conditions. In some examples, if no matching block is found, the CBMS 116 may provide one or more similar blocks back to the client in response.

Assuming the user 102 is able to find a CB of interest, the user can obtain the CB by causing a request to obtain/purchase the CB to be sent (e.g., from computing device 104) to the control plane 122 at circle (3). In some examples, the request is a "purchase capacity block" request that may include an identifier of the CB sought to be obtained (e.g., an "offering ID"). This request is passed to the CBMS 116 and processed by the reservation manager 142 at circle (4). In some examples, the reservation manager 142 checks to ensure that the associated block remains unclaimed and available, that the user is allowed to make such a purchase, etc. The reservation manager 142 may also ensure that the block hasn't changed in any manner since the identifier (e.g., offering ID) was generated, such as by ensuring it still includes slots in a particular location, any associated pricing hasn't changed, etc. The reservation manager 142 may also enforce any usage limits, e.g., to ensure that a particular user account does not (or will not, assuming the CB is obtained) have more than a defined amount of capacity, across all CBs of that user, that is active at a particular moment in time. Thereafter, assuming no issues are found, the reservation manager 142 generates a CB resource (e.g., creates or updates a record in the CB data 132) that is associated with the block and the user's account, and can send a response to the user 102 indicating that the CB was successfully obtained.

Thereafter, the user 102 can make use of the CB by launching instances (e.g., instances 138) into the reservation. For example, the user 102 may issue "launch instance" type commands, as reflected by circle (5), which are received by a cloud manager 112 component at circle (6). The cloud manager 112 interacts with a placement service 114 at circle (7) to determine, among other things, at which slots the instance(s) are to be launched. In some examples, the placement service 114 consults the CB data 132 and/or resource and slot data 126 to determine where to launch these instances. For example, in some deployments the CB might already be tied to particular slots (e.g., medium slots 139 provided by computing devices 134A-134B) and this information can be provided back to the cloud manager 112. In other deployments, a CB may not be tied to specific slots. In this case, the placement service 114 may identify a set of slots for the launch. This placement selection may be governed by a placement rule associated with the CB, e.g., a rule that restricts the potential candidate locations to particular locations of the provider network, such as a particular computing device, to a particular server rack, to a particular aggregation in the network, to a particular spine in the network, to a particular data center, etc. In some examples, the placement "filter" rules may also require that an instance be placed on particular host computing devices that provide certain hardware resources, such as GPUs, local storage capabilities, or the like.

In some examples, these launches will be prohibited from occurring if they are initiated at a time outside of the CB's duration, either by the managed compute service verifying that the CB is in an "active" state, and/or by having the managed compute service "own" the CB (or associated slots, etc.) until the CB's time window begins, when the managed compute service can either re-assign (or share) ownership of the CB (and/or its resources) to the user. Thus, if a user seeks to launch within the CB prior to the CB actually being "in" the user's account, the launch will be prohibited.

With the identified slot locations, the CM 112 can instruct one or more instance management services 118 at circle (8) to orchestrate the actual launch of the instance(s), which includes signaling at circle (9) to cause instances to be launched in the particular slot locations. As shown, the user may have launched five "medium" compute instances 138 into a CB that has capacity 150 providing six slots and thus allowing for up to six instances. Alternatively, or additionally, users can utilize the CB in a more programmatic fashion. For example, a user may run a cloud formation template that can be used to automatically launch multiple instances, configure cloud architecture, and the like.

In some examples, the CBMS 116 may also send messages, or events, indicating a start of the CB (e.g., at a time when the CB's duration is beginning), indicating an ending (or imminent ending) of the CB, or the like. Such messages could be sent as events published to a cloud event bus (e.g., provided by an event bus service), which can be monitored to act in response to particular events—e.g., an instance may be configured to be automatically launched upon detecting an event emitted indicative of the start of a CB, and/or the instance configured to be automatically terminated upon detecting an event emitted indicative of the end of a CB, etc. Of course, other messaging techniques can be utilized, such as publishing data or a log to a monitoring service reflective of the event, sending another type of notification, such as an email, SMS type notification, or the like.

Figure 3:
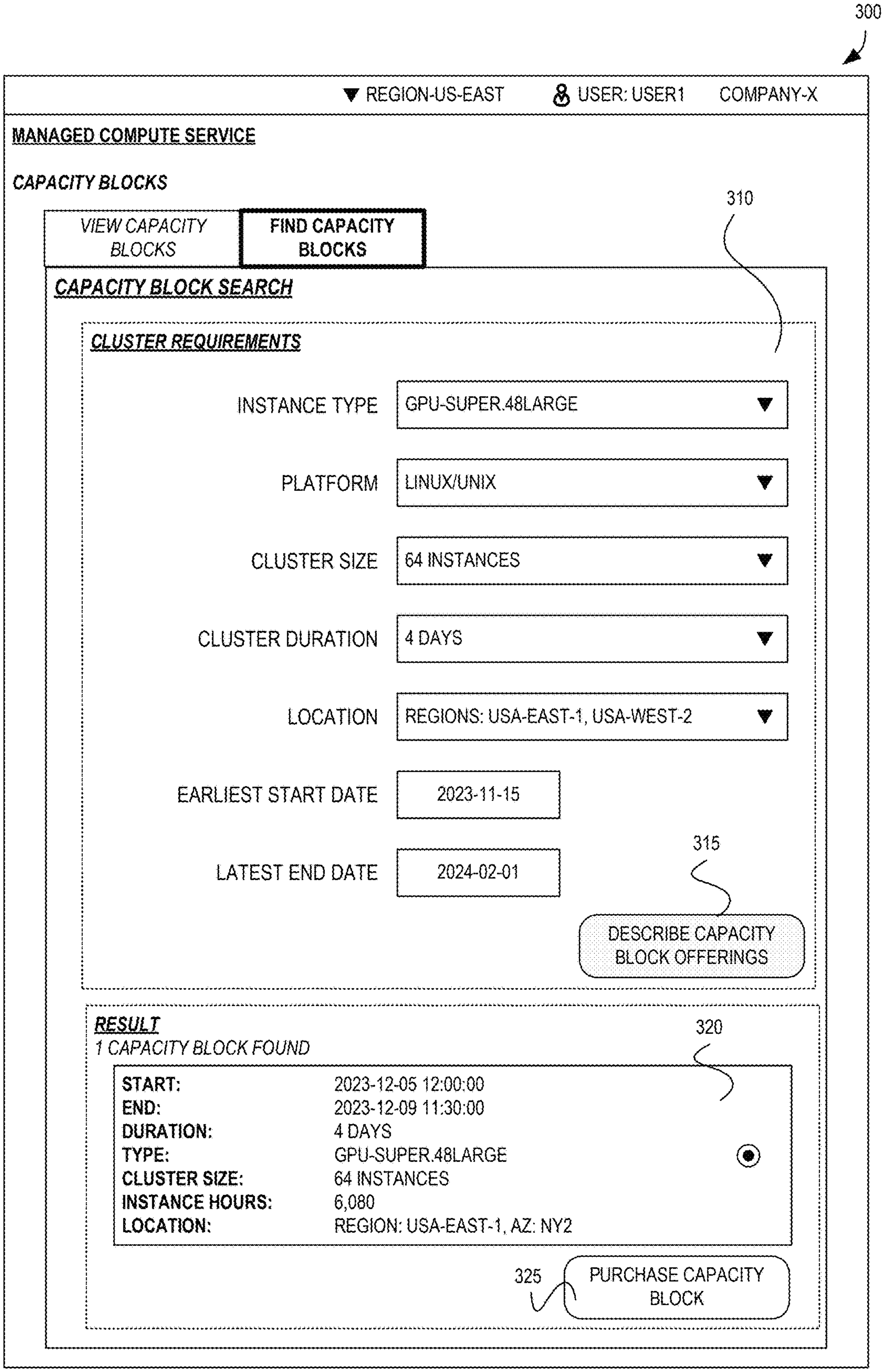
FIG. 3 is a diagram illustrating a graphical user interface for user-driven finding and obtaining capacity blocks in a cloud provider network according to some examples.

As described herein, users can potentially utilize or interact with the CBMS 116 in a variety of ways, depending on the desires of the implementor. For example, users may be able to issue API type requests (e.g., utilize a RESTful API), use a SDK that issues requests, send "command line" type requests, use graphical user interfaces (GUIs) provided by a console type application, etc. To this end, FIG. 3 is a diagram illustrating one exemplary graphical user interface 300 for user-driven finding and obtaining capacity blocks in a cloud provider network according to some examples.

This GUI 300 may be part of a web-based console type application provided by a managed compute service and allow users to interact with the CBMS 116 for finding and reserving CBs. As shown, a first section 310 of the GUI allows users to provide user-specified requirements for a cluster sought by the user. Here, this section 310 includes a variety of user interface input elements (e.g., drop-down boxes, text input boxes, buttons, etc.) allowing a user to specify their preferences for a reservation—e.g., which type of compute instance is desired, which compute platform is desired, what size of cluster is needed in terms of numbers of instances, a needed duration (that is, an amount of time the cluster is needed for), a desired location (or set thereof), and timing information including an earliest desired starting date and/or a latest acceptable ending date. In various examples, more or fewer user-specified requirements may be provided, potentially using different types of input elements, and in some examples not all of these values need to be provided or selected by the user, meaning the user is open to any such value for the particular option. In this example, the user is seeking an instance of type "GPU-SUPER.48LARGE", with a platform of Linux/Unix, with sixty-four instances for four days, located within one of two regions, and between the range of dates starting on 2023 Nov. 15 and 2024 Feb. 1.

The user may then submit a request to describe matching CB offerings by selecting UI element 315, here, a "find capacity block" button. This interaction causes the user's device to submit data causing a "describe capacity block offerings" type message to be sent to the CBMS 116, causing the reservation manager 142 to determine if the requested CB can be accommodated, e.g., if a block exists in the schedule that is available and that meets all (or some) of the requirements specified by the user. In this example, one CB is found to match, and a second portion 320 of the GUI 300 is updated to show the details—here, a matching block with a starting date of 2023 Dec. 5 within the "USA-EAST-1" region.

If this CB is acceptable to the user, they may then select UI element 325, here, a "purchase capacity block" button. This interaction causes the user's device to submit data causing a "purchase capacity block" type message to be sent to the CBMS 116, causing the reservation manager 142 to update records accordingly to grant the CB to the user's account, mark the associated block as unavailable, etc.

Figure 4:
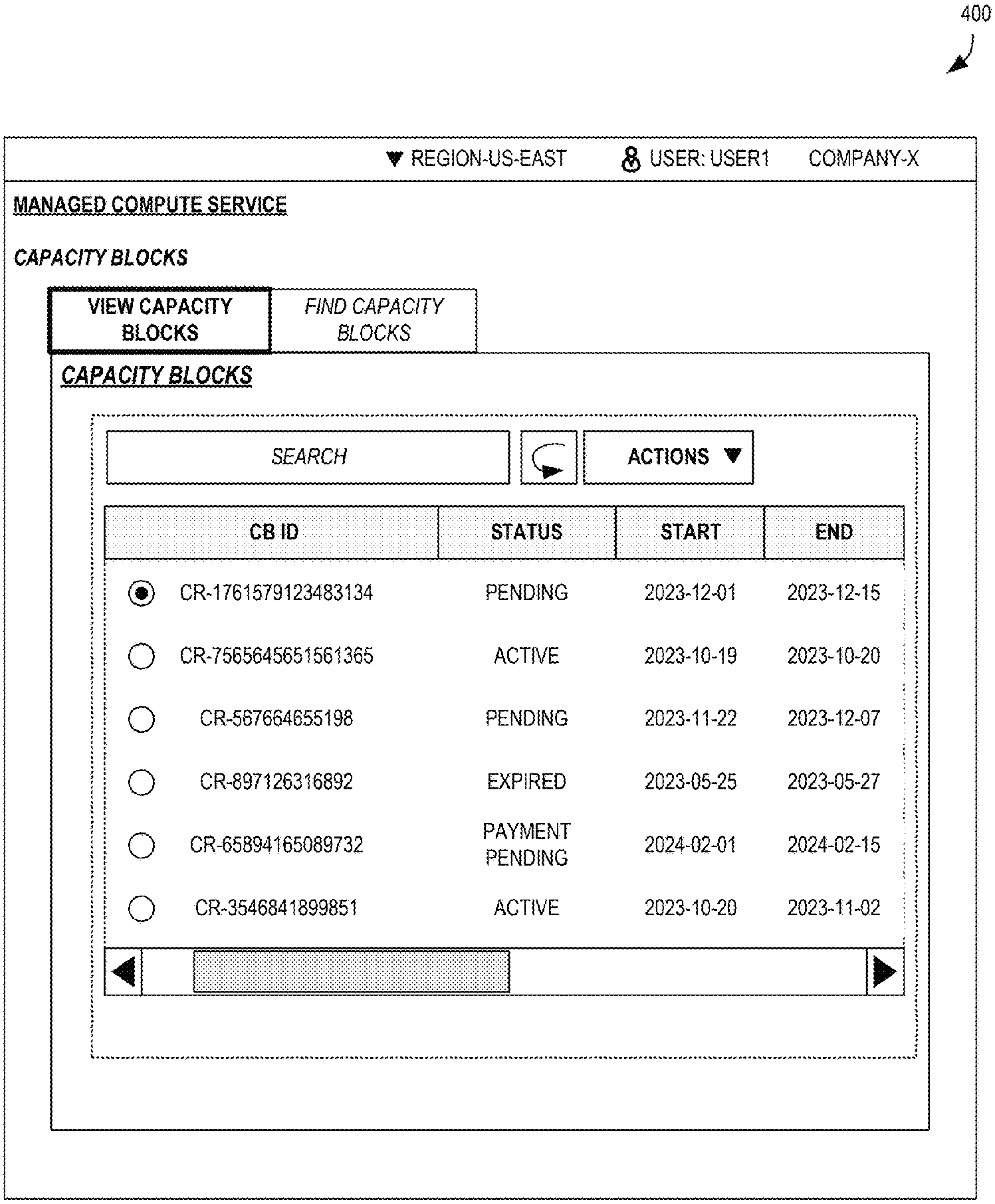
FIG. 4 is a diagram illustrating a graphical user interface for capacity block management in a cloud provider network according to some examples.

In some examples, the user may obtain a number of CBs over time or at a point in time. Information associated with these CBs may be presented to the user via another set of interfaces. FIG. 4 is a diagram illustrating a graphical user interface 400 for capacity block management in a cloud provider network according to some examples. In this example, the user may view a list of CBs associated with the user's account (e.g., purchased by the account or shared with the account), organization, etc. Here, a variety of types of information can be displayed, including a resource identifier (here "CB ID") for each CB, its status (e.g., active, expired, pending—meaning it as been obtained but the time window has not yet been reached, payment pending, etc.), the starting date, an ending date, and potentially a variety of other non-illustrated fields, such as the instance type, duration, cluster size, instance hours, instance price per hour, total price, availability zone, etc.

Figure 5:
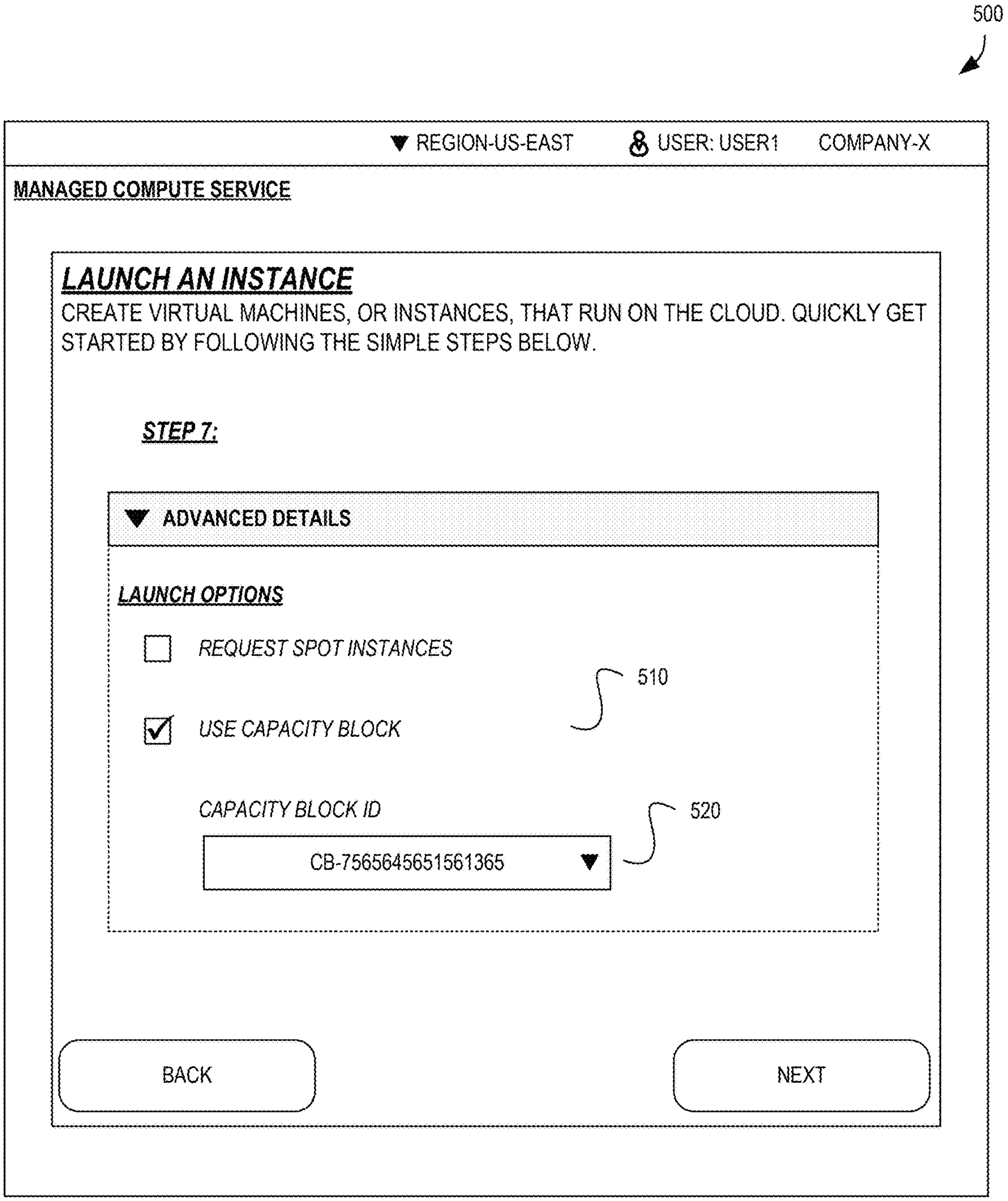
FIG. 5 is a diagram illustrating a graphical user interface useful for launching instances into capacity blocks according to some examples.

The interface 400 may also allow users to search for CBs using various types of metadata (e.g., CB ID, status, dates, associated tags, etc.) and initiate actions (e.g., via "actions" drop down menu) with regard to the CBs, such as viewing additional information about it, canceling it, launching instances into it, and the like. For example, clicking a "launch an instance" type action in such a menu could lead to a set of interfaces provided by the managed compute service. One such interface could be similar to that illustrated in FIG. 5, which is a diagram illustrating a graphical user interface 500 useful for launching instances into capacity blocks according to some examples. As part of a launch process, the managed compute service could cause such an interface 500 to be presented allowing the user to indicate whether the instance sought to be launched is to be part of a CB. Here, the user may use a UI input element 510 to indicate that it is, in fact, to be launched into a CB, and then utilize another UI input element 520 to select (or confirm, provide, etc.) the identifier of the associated CB that the instance is to be launched into. Likewise, in cases where users originate "launch instance" type messages in different ways (e.g., via an API call), users may similarly provide an argument indicating a capacity block ID to launch into, allowing users to simply use these CBs.

As indicated herein, in some examples, users may also interact with the managed compute service (e.g., the CBMS 116) using API type requests. For example, FIG. 6 is a diagram illustrating an exemplary request format 600, request 610, and response 620 for describing capacity block offerings according to some examples.

A "describe capacity block offerings" type request message can be sent to the managed compute service to search for available CBs. The request format 600 may include an argument allowing for a "dry run" that does not actually perform a search (e.g., testing whether the user's account is allowed to search for a CB or the like), an instance type argument to specify a requested type of instance, an instance count argument to specify a desired number of instances, a capacity duration hours argument to specify an amount of time (e.g., in hours) that the instance capacity is to be available, a "start date range" argument to specify an earliest acceptable starting date (or, a set of acceptable starting dates), an "end date range" argument to specify a latest possible ending date (or, a set of acceptable ending dates), a max results argument to specify a maximum number of results that should be returned, and/or a next token argument to provide a "next token" allowing for subsequent search results to be returned (e.g., in the event of a paginated type request seeking only a maximum number of results at a time).

One example request 610 is provided that uses five of these arguments—a requested instance type of "gpu-super.48xlarge," a need for sixteen instances, an earliest start date of 2023 Aug. 14, a latest end date of 2023 Oct. 22, and a requested duration for the CB of two days (as reflected by the capacity duration hours argument of "48").

In a response message 620, one CB block (referred to as an "offering") is provided. This response message 620 provides an offering identifier value that can be used in a subsequent request to actually obtain the CB, the instance type, the availability zone where the instances will be placed, the instance count, a start date (here 2023 Aug. 15, which is within the requested time window), an ending date, the capacity block duration (of two days/forty-eight hours), a total upfront price, an hourly instance rate, and a currency code indicative of the currency type for the price and rate (here, USD is indicative of United States Dollars).

Assuming the user wants to obtain such a CB, the user may cause another request message to be transmitted to the managed compute service to obtain the CB. FIG. 7 is a diagram illustrating an exemplary request format 700, request 710, and response 720 for obtaining capacity blocks according to some examples.

A "purchase capacity block" type request message can be sent to the managed compute service to reserve a CB. The request format 700 may include an optional argument allowing for a "dry run" that does not actually purchase the CB (e.g., testing whether the user's account is allowed to purchase a CB or the like) and/or an optional argument to allow a user to provide a client token. To utilize idempotency, a client token can be a unique, case-sensitive string of ASCII characters, such that a subsequent request with the same token will not cause another action (here, purchasing a CB) if an earlier request was successfully processed.

In some examples, the request format 700 may include an optional list of tag specifications, allowing a caller to provide one or more "tags" (e.g., an ASCII value, a key-value pair of values, etc.) to associate with the CB to allow users to manage, identify, organize, search for, and/or filter resources.

The request format 700, in some examples, includes an offering identifier (e.g., "capacity block offering ID") argument allowing the user to provide an offering identifier associated with an offered CB, e.g., as returned in a describe capacity block offerings response 620 type message. In some examples, the request format 700 includes an instance platform argument identifying the requested type of platform for the instances, which can be an operating system type (e.g., Linux/UNIX, Windows, etc.).

A specific example of a "purchase capacity block" type request message 710, shown in FIG. 7, includes two arguments—an offering identifier string and a requested instance platform string (here, "Linux/UNIX"). An example response 720 to this message 710 is also depicted. The response 720 includes a specific resource identifier for the obtained capacity block—here, a "CapacityReservationId" value of "cr-a1234567," which uniquely identifies the CB in some manner (e.g., across the entire cloud provider network, or even just in the context of the user's account, the associated region, or the like). The response 720 also includes a variety of other values, such as the reservation type, the availability zone the CB will be utilized in (i.e., where the associated instances will be hosted), the creation date/time of the CB, the start and end dates of the CB itself, the platform, the number of instances in the CB, the state of the CB (here, "payment pending," which will be updated upon successful completion of the payment), an identifier of the associated instances types for instances in the CB, and others.

Figure 8:
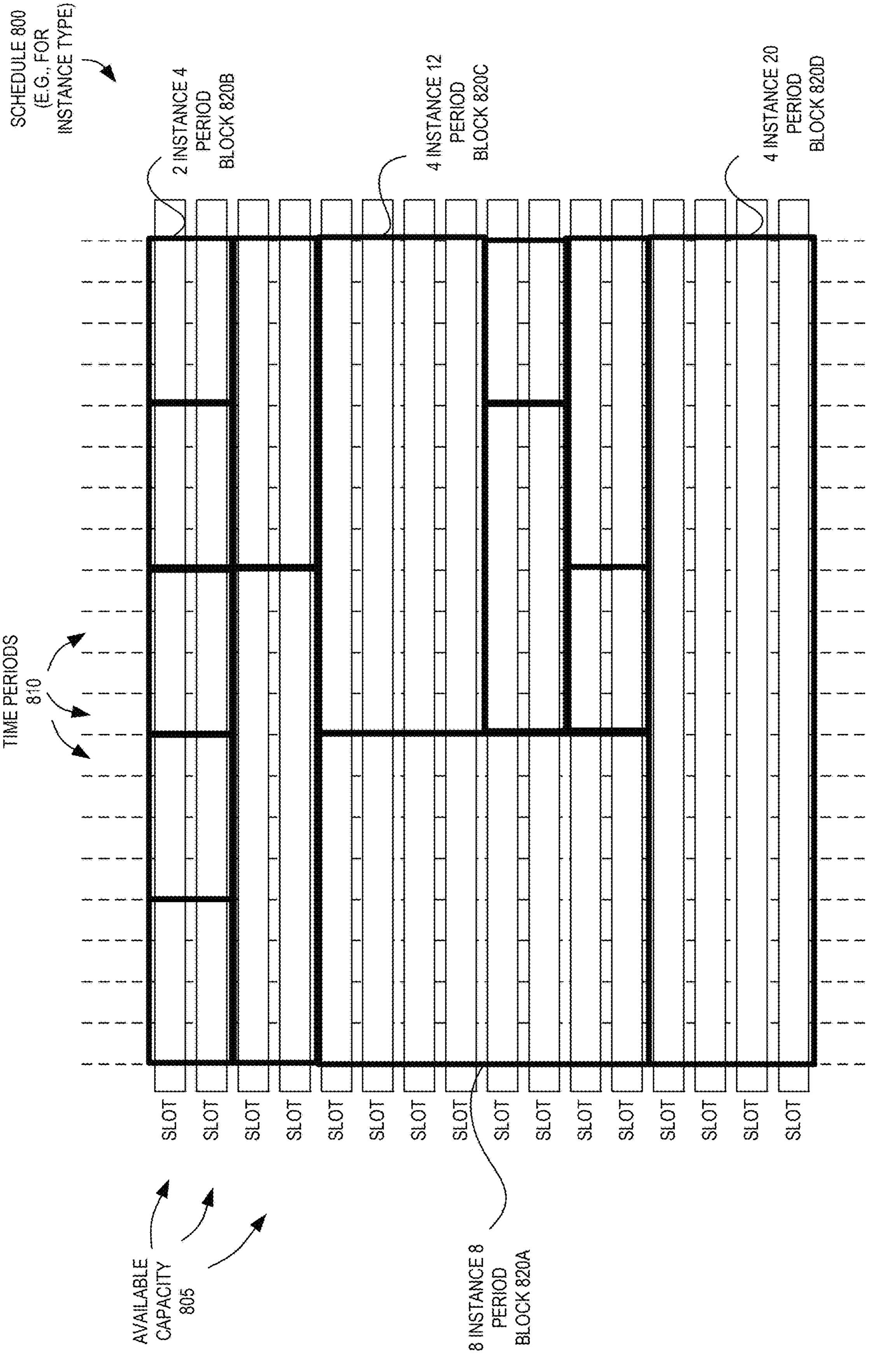
FIG. 8 is a diagram illustrating capacity block generation and schedule placement useful for implementing and utilizing capacity cluster resource reservations in a cloud provider network according to some examples.

As described herein earlier with reference to FIG. 1, in some examples the CBMS 116 (e.g., via the schedule manager 130 component) can generate a schedule of blocks available to be offered to users and ultimately turned into capacity blocks. This schedule generation (and updates thereto) can be performed in a manner that is asynchronous to specific requests, thus making it simple to quickly identify blocks that will or may satisfy a user's query for a particular CB. FIG. 8 is a diagram illustrating capacity block generation and schedule 800 placement useful for implementing and utilizing capacity cluster resource reservations in a cloud provider network according to some examples.

As indicated, the schedule manager 130 may generate and place capacity reservation "blocks" on a schedule. This can occur via the use of a scheduling type algorithm configured to place desired numbers of blocks on a schedule with consideration of capacity available at various points in time. As illustrated in FIG. 8, an amount of available capacity 805 over various time periods 810 can be "filled up" (partially or completely) by placing or associating various blocks to this capacity.

In some examples, the schedule manager 130 obtains forecast data indicating predicted needs for each of a variety of block sizes, where a block can be a combination of a number of instances (of a type) and an amount of time. For example, forecasts can be generated for a variety of block sizes by a forecasting engine 120 as shown in FIG. 1, which can be generated via use of some type of model (e.g., statistical, machine learning, etc.) based on recent "describe capacity block offerings" requests, recently obtained and utilized CBs, and the like. As a specific example, data from "describe capacity block offerings" type requests indicative of requested instance numbers and desired durations for CBs can be used to train or adapt a model, allowing for a future forecasts of these values to be generated.

In some examples, blocks can be added to the schedule under a fairness type approach in which one block at a time (from various block sizes (or "shapes")) is added to the schedule, which may be performed in an ordering according to a block from the block shape with highest predicted demand being added first, and then a block from the block shape with a next highest predicted demand being added next, and so on, perhaps for multiple iterations. Upon a block shape needing to be placed that no longer "fits" in the schedule, that shape can be skipped and the process can continue.

In other examples, blocks can be added more directly in proportion to their anticipated demand. If two block shapes are under consideration, and the highest demand (corresponding to a first shape of blocks) is double the demand of the other block shape, two blocks will be added to the schedule (for the first block shape) for every one block added of the other block shape. Of course, various scheduling approaches can be utilized according to the preferences of the implement, e.g., to add certain block shapes more or less often, to require certain numbers of blocks for a block shape to be added, etc.

As shown, a block placement scheduling approach may result in fourteen blocks being added to a schedule 800. In this example, there are sixteen different slots of available capacity 805 and the schedule 800 is formed for a total of twenty periods of time (e.g., days, hours, half-days, weeks, etc.). Here, a total of seven blocks corresponding to a "2/4" block shape 820B (for two instances for four periods of time) are placed on the schedule along with a variety of other blocks of different shapes. For example, an "8/8" block shape 820A (for eight instances for eight periods of time) is placed, as well as a "4/12" block shape 820C, a "4/20" shape 820D, and the like.

In some examples, this scheduling may be performed on a periodic basis to add additional blocks, if possible. In one example, the scheduling is initiated to attempts to add additional blocks starting some number of time periods in the future—e.g., attempt to add blocks with a start date fourteen (14) days in the future, if capacity exists.

Block reconfiguration can also be performed. For example, the scheduling may consider removing already-placed blocks that remain un-purchased, and determining whether that capacity might be better used as a different-sized block or combination of blocks (e.g., a large un-purchased block has not been searched for as of late, while other block shapes may have been—the large block may be removed and blocks for these other block shapes can be added in place). Thus, in some examples a single block can be replaced with another block, or replaced with multiple other blocks. Likewise, multiple blocks can potentially be replaced with a single block or multiple other blocks.

Figure 9:
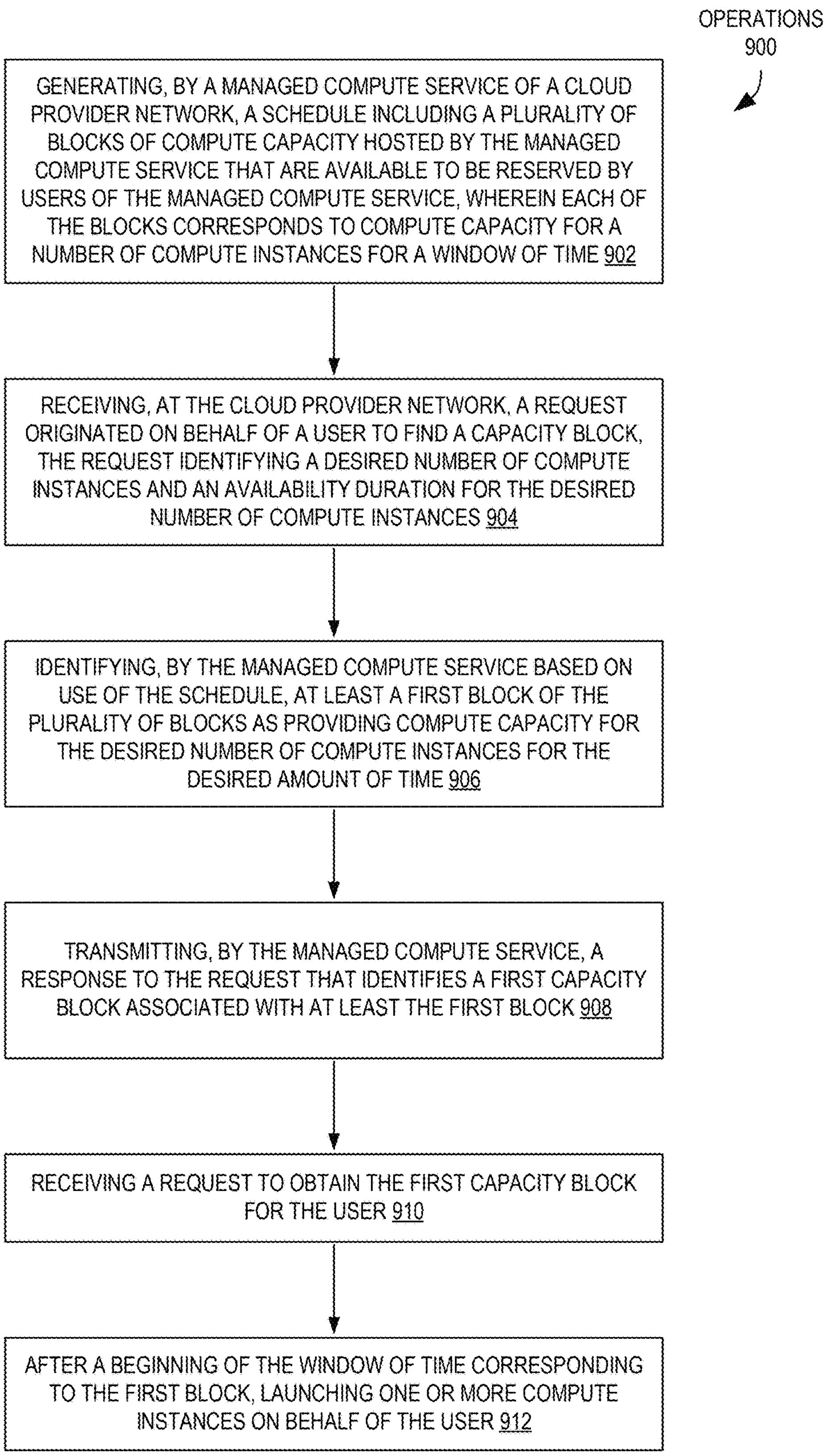
FIG. 9 is a flow diagram illustrating operations of a method for utilizing capacity cluster resource reservations in a cloud provider network according to some examples.

FIG. 9 is a flow diagram illustrating operations 900 of a method for utilizing capacity cluster resource reservations in a cloud provider network according to some examples. Some or all of the operations 900 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 900 are performed by the control plane 122 (e.g., the CBMS 116) of the other figures.

The operations 900 include, at block 902, generating, by a managed compute service of a cloud provider network, a schedule including a plurality of blocks of compute capacity hosted by the managed compute service that are available to be reserved by users of the managed compute service, wherein each of the blocks corresponds to compute capacity for a number of compute instances for a window of time.

The operations 900 further include, at block 904, receiving, at the cloud provider network, a request originated on behalf of a user to find a capacity block, the request identifying a desired number of compute instances and an availability duration for the desired number of compute instances.

The operations 900 further include, at block 906, identifying, by the managed compute service based on use of the schedule, at least a first block of the plurality of blocks as providing compute capacity for the desired number of compute instances for the desired amount of time.

The operations 900 further include, at block 908, transmitting, by the managed compute service, a response to the request that identifies a first capacity block associated with at least the first block.

The operations 900 further include, at block 910, receiving a request to obtain the first capacity block for the user.

The operations 900 further include, at block 912, after a beginning of the window of time corresponding to the first block, launching one or more compute instances on behalf of the user.

In some examples, at least one of the blocks involves multiple compute instances of a type providing access to graphics processing unit (GPU) processing resources.

In some examples, the first block has a different number of compute instances than a number of compute instances of a second block; or the first block has a different size window of time than the window of time of the second block.

In some examples, the compute capacity for each of the plurality of blocks is selected to be located in a portion of the cloud provider network to ensure a latency characteristic for communications between the number of compute instances in the block is satisfied. For example, a latency characteristic may be satisfied when all instances are within a particular number of network hops from one another, or are all located in a same data center (or portion thereof). In some examples, the launching of the one or more compute instances includes utilizing a placement rule that constrains slot selection, for the one or more compute instances, to be within the portion of the network.

In some examples, the launching of the one or more compute instances includes: receiving a request to launch the one or more compute instances, the request including an identifier of the first capacity block; and selecting one or more slots to launch the one or more compute instances based on the first capacity block.

In some examples, generating the schedule comprises: generating demand forecasts for a plurality of block types, each block type corresponding to a different combination of compute instance count and availability duration; and placing the plurality of blocks on the schedule based at least in part on use of the demand forecasts.

In some examples, the operations 900 further include determining to add a new block to the schedule; and replacing a second block on the schedule and a third block on the schedule with the new block, or replacing the second block with the new block and a second new block.

In some examples, the request to find the capacity block identifies an earliest start date and the identified block has a corresponding window of time that starts on or after the earliest start date; or the request to find the capacity block identifies a latest end date and the identified block has a corresponding window of time that ends on or before the latest end date.

In some examples, the request to find the capacity block identifies at least one of: a type of compute instance; a type of operating system; or a region of the cloud provider network that is to host the one or more compute instances.

In some examples, the operations 900 further include: emitting a first event (e.g., via an event bus) indicative of a start of the first capacity block, wherein the event causes a request to be originated seeking the launching of the one or more compute instances; or emitting a second event indicative of an end or an upcoming end of the first capacity block, wherein the event causes a request to be originated seeking the termination of the one or more compute instances.

To provide highly-performant service for CBs, it is important to ensure that users can quickly launch instances into these CBs so that they can begin work, while also ensuring that these instance slots (and supporting operating environments) are thoroughly "cleaned" to ensure that no impacts of previous utilization remain (e.g., that no activity from one user affects or in any way impacts another user) and further that all available hardware is working properly (e.g., as, in practice, certain hardware failures do arise over time, which can affect memory, GPUs, and the like). Accordingly, examples described herein provide improved techniques for launching compute instances, improving performance of instances, providing efficient hardware resource checking, and/or providing efficient instance slot scrubbing.

In many cloud environments, data needed to launch user compute instances (or, needed by the compute instances after launch) may not be located on the same physical device as that instance. For example, some cloud provider networks utilize network-based block storage volumes that are attached to compute instances 212, which provide an instance a local volume that it can interact with (e.g., read files from and/or write files to), while the actual data itself may actually be stored at a remote location. Thus, upon a file access, the data is retrieved from across the network and then made visible to the instance. While this works well in cloud settings, this may slow down the boot or use of the instance as it begins, as the initial set of files it needs (e.g., on a boot volume, or for an application) must initially be fetched across the network, which is a comparatively slow operation. Thereafter, once most or all of the files it needs have been fetched and thus, the network-backed volume is sufficiently "hydrated" with the data itself—operation of the instance is extremely performant.

In some examples, instances can be launched faster, and/or have improved performance at the onset of its execution, using a local boot and/or prewarming process that can be performed by the computing device itself through use of an auxiliary compute instance acting as an "initializer" domain.

Figure 10:
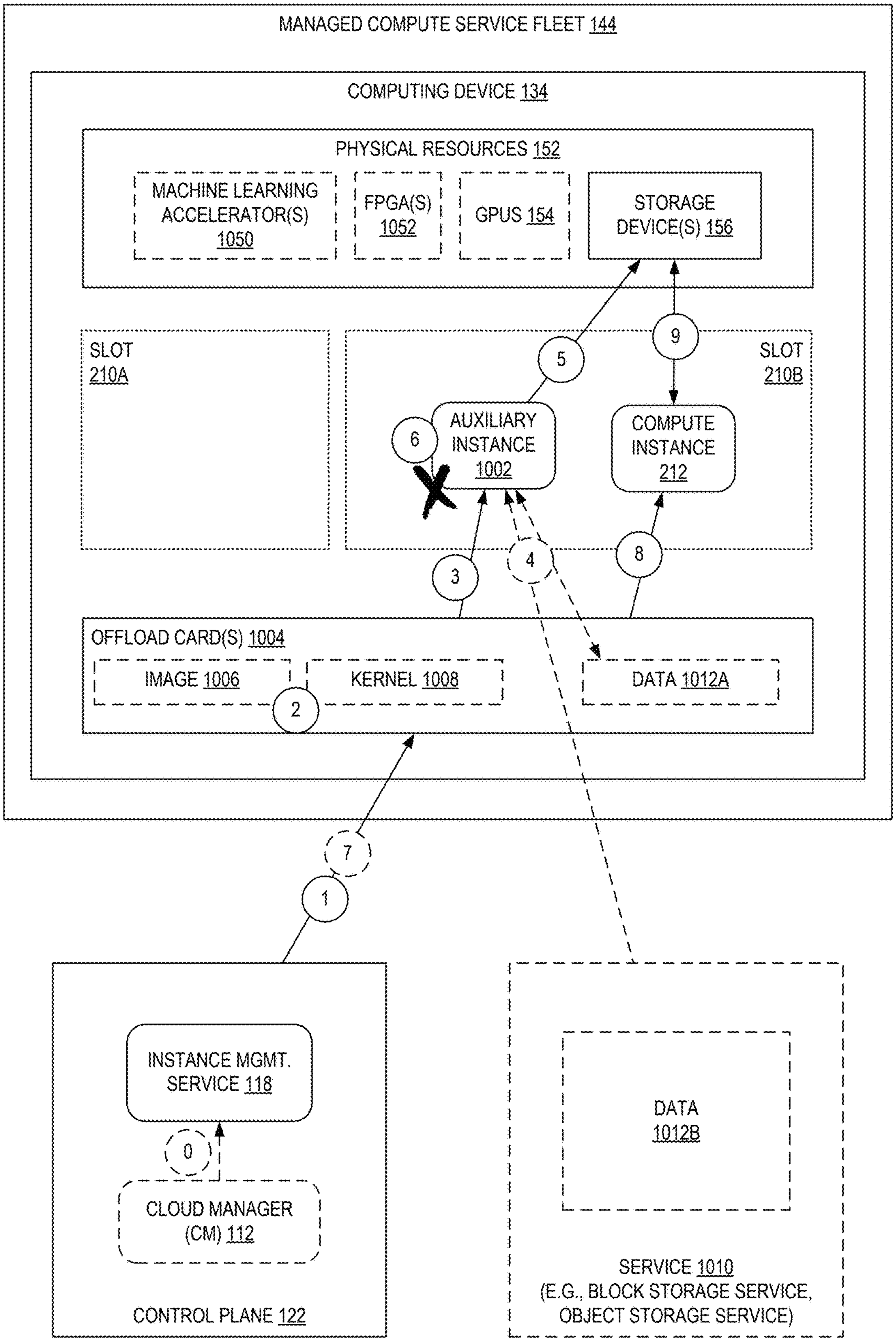
FIG. 10 is a diagram illustrating same-slot instance pre-launch auxiliary instance utilization according to some examples.

FIG. 10 is a diagram illustrating same-slot instance prelaunch auxiliary instance utilization according to some examples. In some examples, prior to launching a compute instance 212 for a user, the computing device 134 itself can launch an auxiliary instance 1002 in the same slot 210B (that the compute instance 212 will utilize) to perform operations involving physical resources 152 of the computing device 134, such as "hydrating" a local storage device 156 (e.g., an SSD, magnetic disk drive, etc.) to have data needed by the user's about-to-be-launched compute instance 212. Because this auxiliary instance 1002 can be a virtual machine having a complete operating system or a portion thereof (e.g., an operating system kernel), the auxiliary instance 1002 can interact with storage on a file-level basis (due to it having a file system) instead of merely on a lower-level basis, and thus obtain the actual data needed for/by the user instance. Accordingly, the auxiliary instance 1002 can perform tasks using a full user-space, drivers, etc., to perform tasks involving one or more types of physical resources 152, such as storage devices 156, GPU(s) 154, FPGA(s) 1052, machine learning accelerator(s) 1050, etc.

For example, responsive to a launch instance command at circle (0) from CM 112, an instance management service 118 is tasked with launching a particular user compute instance (212) at a particular location (e.g., within slot 210B on computing device 134). At circle (1), the instance management service 118 transmits one or more commands to the computing device 134, which here is provided to an offload card 1004 providing VMM-type functionalities, indicating a request to launch an auxiliary instance 1002 in a particular slot 210B.

Thereafter, the offload card 1004 may access, at circle (2), a virtual machine instance image 1006 (stored on the offload card 1004, or on another storage device), a locally-stored kernel 1008, or similar data (e.g., mounting a "file disk" storing data to implement a file-backed disk, a RAM disk, etc.), and at circle (3) launch the auxiliary instance 1002. Note, this auxiliary instance 1002 executes within a same slot 210B as the user's compute instance 212 will eventually execute in, and while the user does not have access to (or perhaps visibility of) the auxiliary instance 1002, it can access the same set of physical resources (e.g., the same GPUs 154, the same storage devices 156 or portions thereof) as the user's compute instance 212 will.

Thereafter, the auxiliary instance 1002 can perform an initialization workflow to pre-warm a particular set of resources, e.g., by attaching a volume (to be used by the user compute instance 212), fetching data 1012B for the volume at circle (4), and storing it to a local storage device 156 at circle (5). This volume can be a boot volume including files needed by an operating system to boot or another type of volume having files that will be needed by the user compute instance 212. In some examples, this data '112A may be stored on-device, e.g., by the offload card 1004, such as a boot volume commonly used by a particular user or by instances of a particular type. In other examples, the data '112B may be remote, e.g., individual files (or similar objects) stored by an object storage service, block-type data stored by a block storage service, etc. At the conclusion of this work, the auxiliary instance 1002 is terminated.

Upon the conclusion of this pre-warming and the termination of the auxiliary instance 1002, the instance management service 118 at circle (7) may signal the computing device 134 to launch the user compute instance 212, which is launched at circle (8) by the offload card 1004, including attaching a volume to the compute instance 212 that is backed by the pre-warmed volume stored by storage device 156. In alternate examples, circle (7) may not be necessary as the original launch, via circle (1), may be a combined launch of an auxiliary instance 1002 and the user compute instance 212 such that the offload card 1004 launches the user compute instance 212 upon the termination of the auxiliary instance 1002, i.e., without needing to wait for a command to do so from the instance management service 118.

Thus, the compute instance 212 can use the locally stored data via storage device 156, at circle (9), without needing to wait to obtain it, on a file-by-file basis, from a remote service 1010. Thus, such as when the pre-warmed data is for files of a boot volume, the compute instance 212 can quickly boot in a "local boot" type manner. Alternatively, such as when the pre-warmed data is data associated with another application or us, the compute instance 212 can access it much, much faster than if it was initially remote to the computing device 134.

Figure 11:
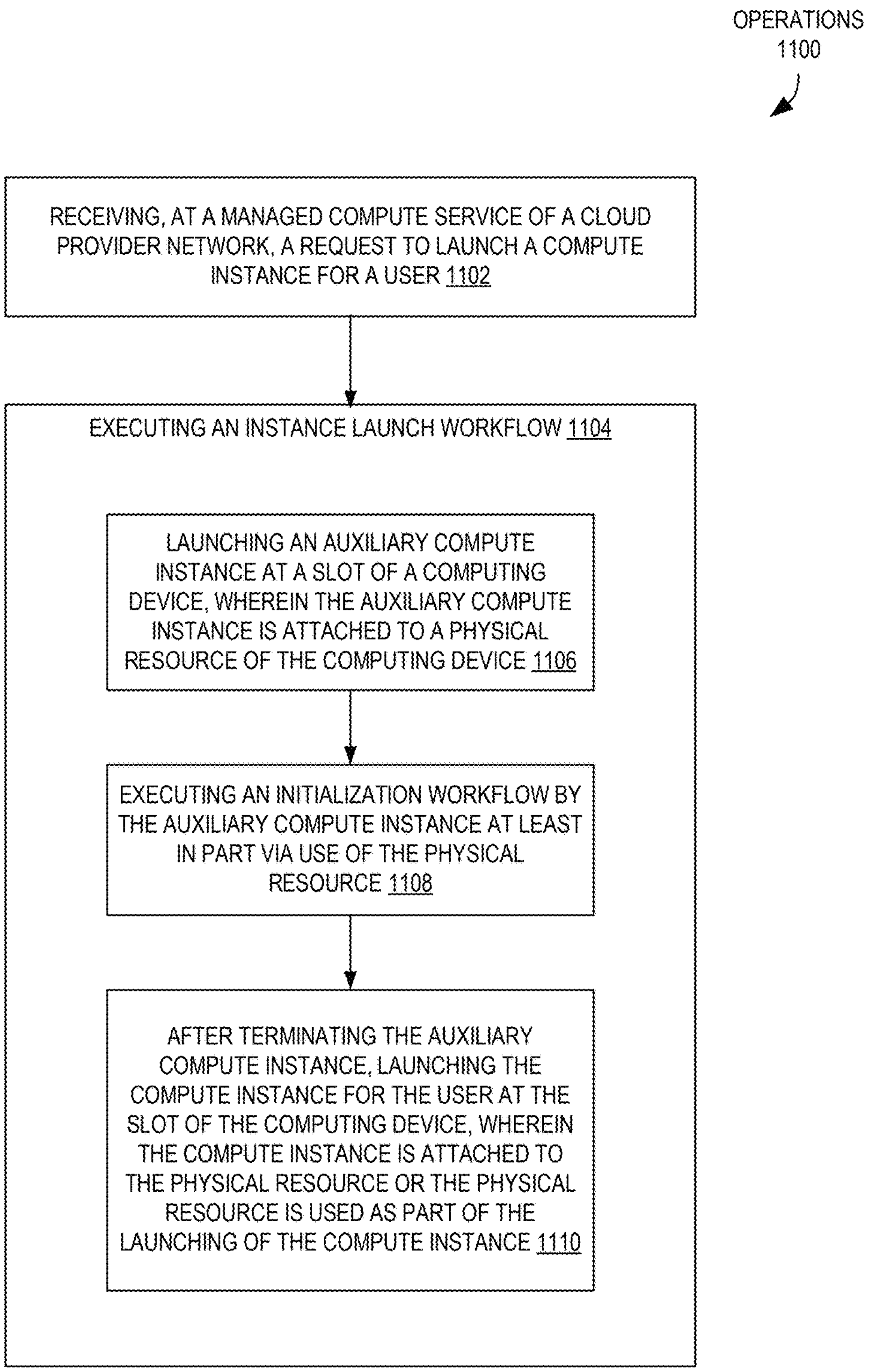
FIG. 11 is a flow diagram illustrating operations of a method for utilizing auxiliary instances for pre-instance launch optimization according to some examples.

FIG. 11 is a flow diagram illustrating operations 1100 of a method for utilizing auxiliary instances for pre-instance launch optimization according to some examples. Some or all of the operations 1100 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1100 are performed by the managed compute service of the other figures.

The operations 1100 include, at block 1102, receiving, at a managed compute service of a cloud provider network, a request to launch a compute instance for a user.

The operations 1100 further include, at block 1104, executing an instance launch workflow. Block 1104 includes, at block 1106, launching an auxiliary compute instance at a slot of a computing device, wherein the auxiliary compute instance is attached to a physical resource of the computing device.

Block 1104 also includes, at block 1106, executing an initialization workflow by the auxiliary compute instance at least in part via use of the physical resource.

Block 1104 also includes, at block 1106, after terminating the auxiliary compute instance, launching the compute instance for the user at the slot of the computing device, wherein the compute instance is attached to the physical resource or the physical resource is used as part of the launching of the compute instance.

In some examples, the physical resource comprises a non-volatile storage device of the computing device.

In some examples, the initialization workflow hydrates a volume, for subsequent use by the compute instance, by obtaining data of the volume from a remote storage location and storing the data on the non-volatile storage device. In some examples, the data stored on the non-volatile storage device is used as a boot volume for the compute instance.

In some examples, the launching of the auxiliary compute instance includes utilizing a file disk, provided by the computing device, to boot the auxiliary compute instance. In some examples, the file disk is provided by data stored by an offload card of the computing device.

In some examples, the initialization workflow includes accessing data, by the auxiliary compute instance, of a network-backed volume provided by a block storage service of the cloud provider network and storing the data to the non-volatile storage device, wherein the compute instance utilizes the data stored to the non-volatile storage device but not the network-backed volume. For example, the network-backed volume may be "owned" by the cloud provider network and not directly accessible to the compute instance.

In some examples, at a time of launching the auxiliary compute instance the slot is reserved for the user, and wherein the auxiliary compute instance is not visible to or accessible by the user.

In some examples, the launching of the auxiliary compute instance occurs via use of a kernel or disk image stored by an offload card of the computing device.

In some examples, launching the auxiliary compute instance includes attaching a volume to the auxiliary compute instance, wherein the volume is a network-backed volume generated via use of a point-in-time volume snapshot.

In some examples, the managed compute service comprises a hardware virtualization service of the cloud provider network, wherein the compute instance comprises a virtual machine (VM).

Additionally, the cloud provider network needs to ensure that sufficient resources exist and are available for all of its users. In a naïve implementation—absent huge amounts of "reserve" capacity that is typically not used and thus wasted—it could be the case that insufficient capacity may arise for certain users to launch instances into their CBs. For example, if a user's CB was fully utilized and that user then attempts to terminate one of their instances and then re-launch it immediately thereafter, it may be the case that no satisfactory capacity may exist for the launch. This may result because there could be no available slot within a satisfactory location (e.g., having a sufficiently "nearby" location that ensures performant communications) and further due to the slot of the terminated instance being unavailable due to the need, by the managed compute service, to "scrub" or check the "health" (functionality) of hardware associated with that slot after it has become free, which could take a large amount of time due to this involving many different services, systems, communications, etc.

Examples disclosed herein can address some or all of these issues using one or more techniques. In some examples, health checking of an instance can be performed within an instance "stop/termination" workflow, and thus the health checks are performed while the instance is still in a state of shutting down. Accordingly, users will need to await the full termination of the instance—and the associated health checking, scrubbing, etc.—prior to being able to launch another instance in its place. While in other systems this health checking and/or scrubbing process takes substantial amounts of time and thus could not be performed during shutdown (as it would be unacceptable to users to have incredibly long "terminating" wait times), examples disclosed here can substantially speed up the process by quickly performing these operations in a more "local-to-the-device" manner, reducing the need to involve potentially many other services and the resultant delays. Moreover, these techniques can prevent a single user from consuming more capacity than what they've reserved, and potentially impacting other users through the removal of available capacity that they are entitled to.

Figure 12:
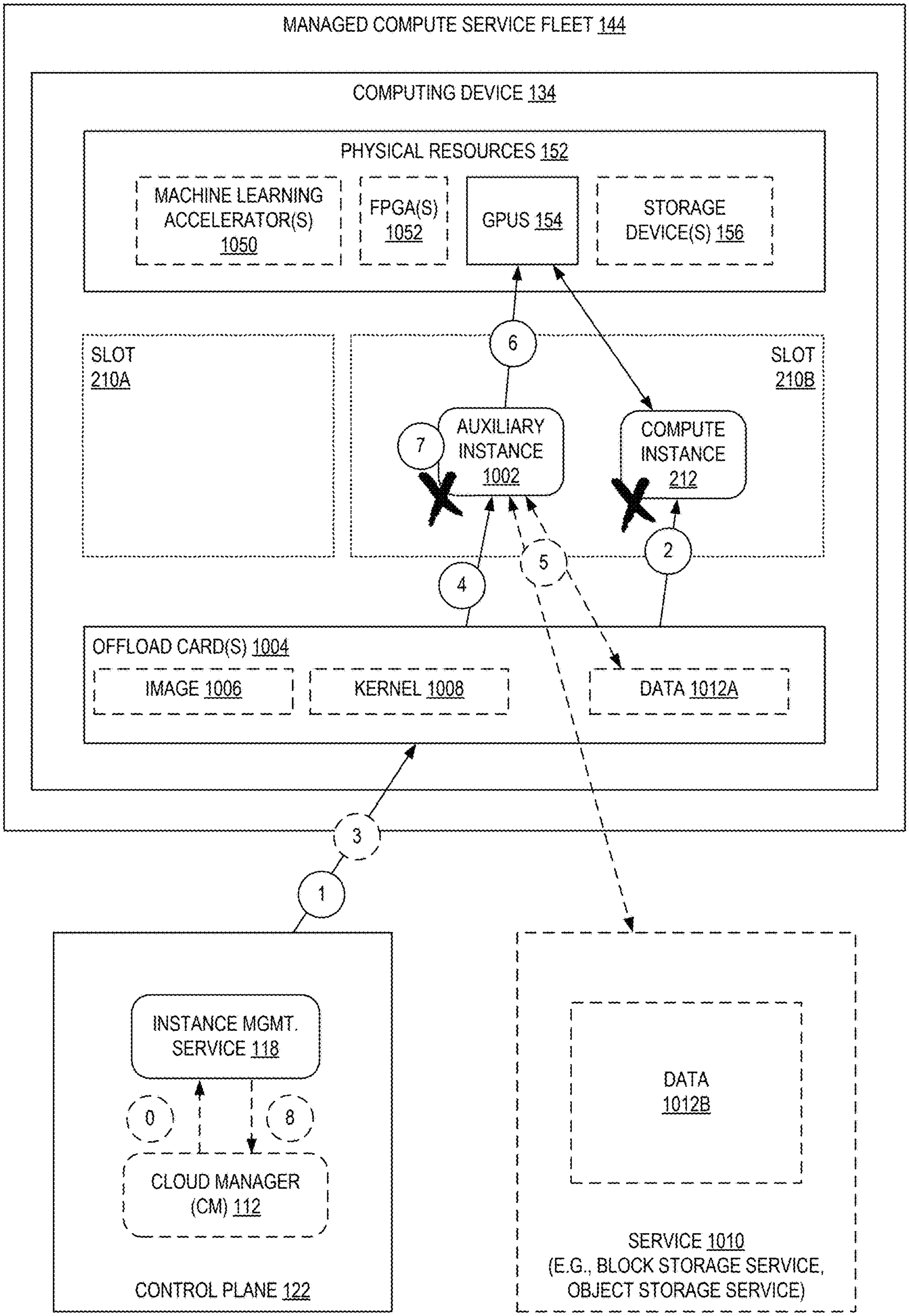
FIG. 12 is a diagram illustrating same-slot instance shutdown auxiliary instance utilization according to some examples.

FIG. 12 is a diagram illustrating same-slot instance shutdown auxiliary instance utilization according to some examples. In some examples, an auxiliary instance 1002 is launched as a "de-initializer" (or "scrubber") in a slot of a just-terminated user instance to perform a cleanup workflow including health-checking and/or clean-up operations involving local physical resources 152 (e.g., GPU(s) 154, FPGA(s) 1052, machine learning accelerator(s) 1050, storage device(s) 156, etc.) while the instance remains in a "shutting down" type status, and only then "releasing" the terminated compute instance from the slot (e.g., prior to changing the instance's state to "terminated", which would release the capacity of the instance and free the user to re-launch another instance using that capacity). Pushing the initialization of health-checking down as close as possible to the computing device 134 has a number of benefits compared to other systems, including reducing the load on the rest of the control plane of the provider network as it does not need to launch and terminate a full instance (a process that may involve many different services and accompanying delays), which can reduce this time by perhaps an order of magnitude. Further, "de-initializer" actions can be invisible to the rest of the control plane, reducing its management complexity, as they instead become part of a normal instance lifecycle.

As shown in FIG. 12, upon being signaled to terminate a user compute instance 212 (e.g., by CM 112 at circle (0)), the instance management service 118 can send a command at circle (1) to the computing device 134 (e.g., to the offload card 1004), which at circle (2) may cause the compute instance 212 to be terminated.

In some examples, the instance management service 118 can send, at circle (3), a command to the computing device 134 (e.g., to the offload card 1004) indicating a request to perform health-checking and/or other clean-up operations by launching, at circle (4), an auxiliary instance 1002 tasked with performing these duties. Alternatively, in some examples the message at circle (3) is not needed, as the offload card 1004 may have been instructed to both terminate the compute instance 212 as well as launch the auxiliary instance 1002 via the message at circle (1).

Similar to as described earlier, the auxiliary instance 1002 can be launched based on use of a virtual machine image 1006 stored by the offload card 1004 (which may have been retrieved from a remote system, such as service 1010), via use of a kernel 1008 stored by the offload card 1004, etc. The launching can, in some examples, include attaching a volume (e.g., local volume, a network-backed volume, etc.) to the auxiliary instance 1002 that includes scripts, applications, drivers, or the like, enabling the auxiliary instance 1002 to interact with the physical resources. The volume can optionally be launched via use of a point-in-time "snapshot" of a volume, which can optionally be obtained from a remote service. Thus, the auxiliary instance 1002 can then interact with the physical resources 152 used by the user compute instance 212—e.g., to reset configuration values to default values, to ensure all data is cleared, to perform health-checking with the GPUs (as GPUs can partially or completely fail over time) such as through use of testing programs, which may be provided by a manufacturer of the GPUs 154.

If any issues are found, the auxiliary instance 1002 can generate an event (e.g., to be sent via an event notification service, event bus service, queue service, etc.) or message (e.g., to be sent to the instance management service 118) indicative of the issue, and the computing device 134 may be taken out of the active or "available" resources of the fleet 144. Otherwise, the auxiliary instance 1002 can optionally generate an event or message indicating the completion of its work, and at circle (7) the auxiliary instance 1002 is terminated.

At this point, the instance management service 118 can inform, via a message sent at circle (8), the CM 112 that the termination has been completed. This "releases" the user's compute instance from being deemed as executing in the slot, which provides them the ability to re-launch the instance (or similar instance) using that instance capacity (e.g., as one of the instances available in the CB). Accordingly, a user who terminates cannot immediately launch an instance immediately after termination on another slot, which perhaps may take capacity away from another user who has a reserved slot. Thus, by "pinning" the user to the slot while the health checks and other de-initialization work is completed, users are not able to take capacity from other users.

Figure 13:
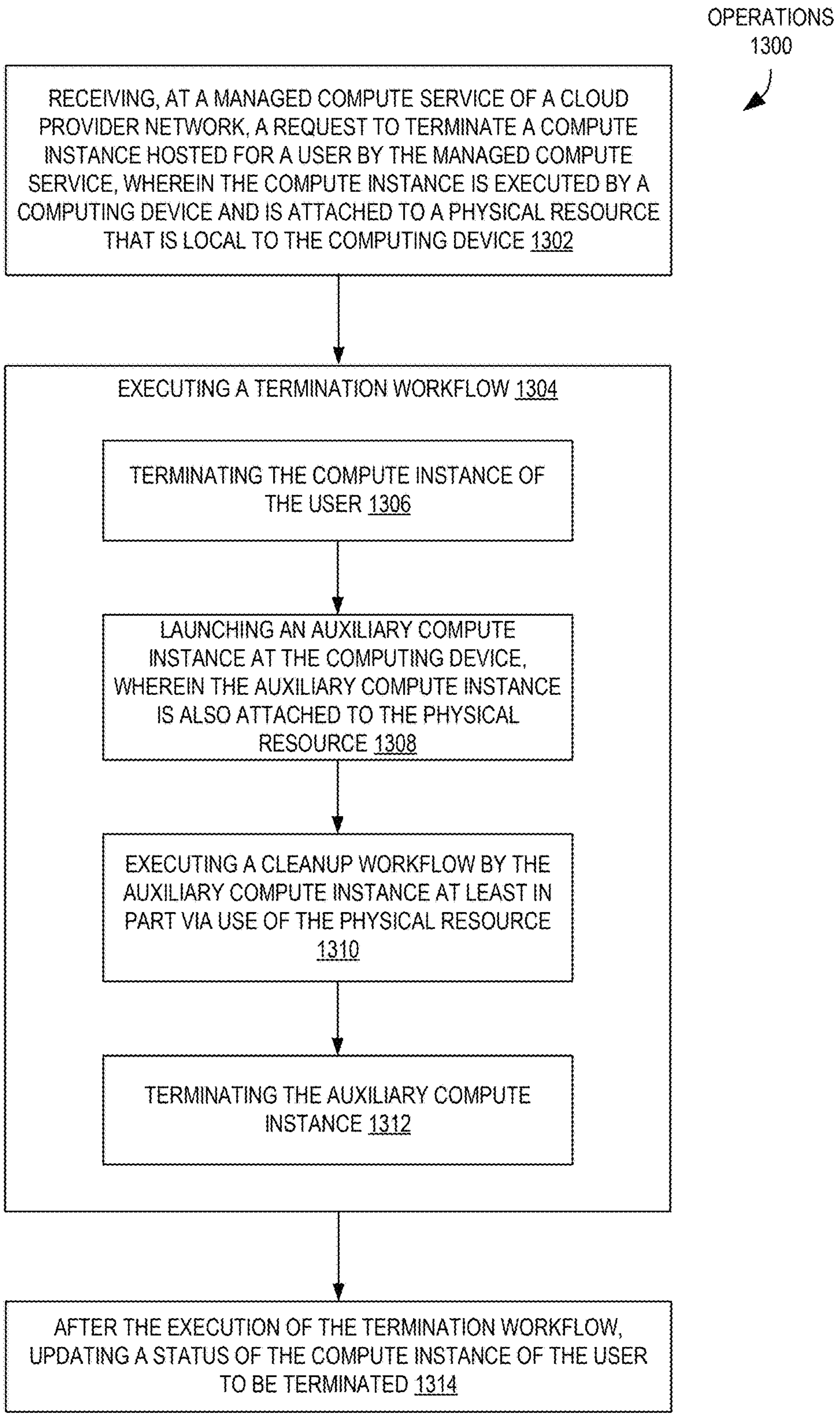
FIG. 13 is a flow diagram illustrating operations of a method for utilizing auxiliary instances for instance shutdown optimization according to some examples.

FIG. 13 is a flow diagram illustrating operations 1300 of a method for utilizing auxiliary instances for instance shutdown optimization according to some examples. Some or all of the operations 1300 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1300 are performed by managed compute service of the other figures.

The operations 1300 include, at block 1302, receiving, at a managed compute service of a cloud provider network, a request to terminate a compute instance hosted for a user by the managed compute service, wherein the compute instance is executed by a computing device and is attached to a physical resource that is local to the computing device.

The operations 1300 further include, at block 1304, executing a termination workflow. Block 1304 includes, at block 1306, terminating the compute instance of the user. Block 1304 also includes, at block 1308, launching an auxiliary compute instance at the computing device, wherein the auxiliary compute instance is also attached to the physical resource, and at block 1310, executing a cleanup workflow by the auxiliary compute instance at least in part via use of the physical resource. Block 1304 also includes, at block 1312, terminating the auxiliary compute instance.

The operations 1300 further include, at block 1314, after the execution of the termination workflow, updating a status of the compute instance of the user to be terminated.

In some examples, the auxiliary compute instance is launched within a same slot of the computing device as used by the compute instance whereby the auxiliary compute instance is attached to the same physical resource (e.g., set of GPUs) as used by the compute instance, wherein the computing device includes one or more other physical resources (e.g., other GPUs) that were not attached to the compute instance and are not attached to the auxiliary compute instance.

In some examples, the physical resource comprises a graphics processing unit (GPU). In some examples, the cleanup workflow comprises performing one or more health checks of the GPU to test a functionality of the GPU. In some examples, the cleanup workflow further comprises resetting one or more user-modifiable configurations of the GPU.

In some examples, launching the auxiliary compute instance includes attaching a volume to the auxiliary compute instance, wherein the volume includes software or drivers used for testing GPU functionality.

In some examples, the volume is a network-backed volume generated via use of a point-in-time volume snapshot.

The operations 1300 further include, in some examples, prior to or upon the terminating of the compute instance of the user, updating a status value associated with the compute instance to be in a shutting down state indicating that the compute instance has not yet been terminated, wherein the status value remains in the shutting down state after the terminating of the auxiliary compute instance.

In some examples, the launching of the auxiliary compute instance occurs via use of a kernel or disk image stored by an offload card of the computing device.

In some examples, after the terminating the compute instance of the user but before the terminating of the auxiliary compute instance, the compute instance remains an in-use resource associated with an account of the user.

In some examples, the managed compute service comprises a hardware virtualization service of the cloud provider network, wherein the compute instance comprises a virtual machine (VM).

As described herein, these techniques and systems disclosed herein can beneficially used for workloads such as HPC computing tasks, ML training tasks, and like. However, other types of applications can benefit as well, including but not limited to electronic design automation (EDA) tasks, graphics processing tasks, etc.

Figure 14:
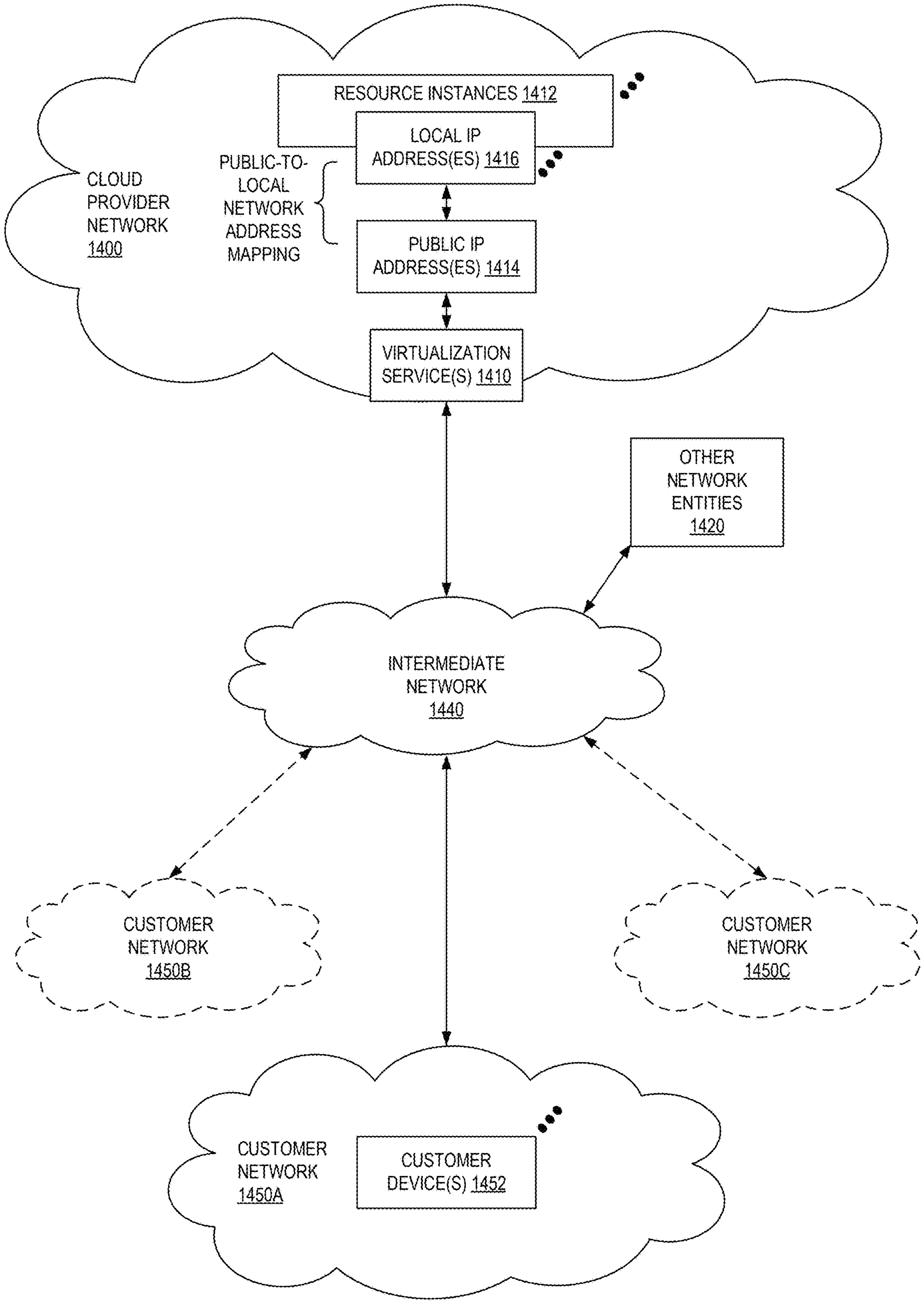
FIG. 14 illustrates an example cloud provider network environment according to some examples.

FIG. 14 illustrates an example provider network (or "service provider system") environment according to some examples. A provider network 1400 can provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 can be associated with the resource instances 1412; the local IP addresses are the internal network addresses of the resource instances 1412 on the provider network 1400. In some examples, the provider network 1400 can also provide public IP addresses 1414 and/or public IP address ranges (e.g., Internet Protocol version 4 (IPv4) or Internet Protocol version 6 (IPv6) addresses) that customers can obtain from the provider 1400.

Conventionally, the provider network 1400, via the virtualization services 1410, can allow a customer of the service provider (e.g., a customer that operates one or more customer networks 1450A-1450C (or "client networks") including one or more customer device(s) 1452) to dynamically associate at least some public IP addresses 1414 assigned or allocated to the customer with particular resource instances 1412 assigned to the customer. The provider network 1400 can also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of the customer network(s) 1450A-1450C can, for example, implement customer-specific applications and present the customer's applications on an intermediate network 1440, such as the Internet. Other network entities 1420 on the intermediate network 1440 can then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 can be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1400; a customer can then assign their allocated public IP addresses to particular resource instances allocated to the customer. These public IP addresses can be referred to as customer public IP addresses, or simply customer IP addresses. Instead of being assigned by the provider network 1400 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
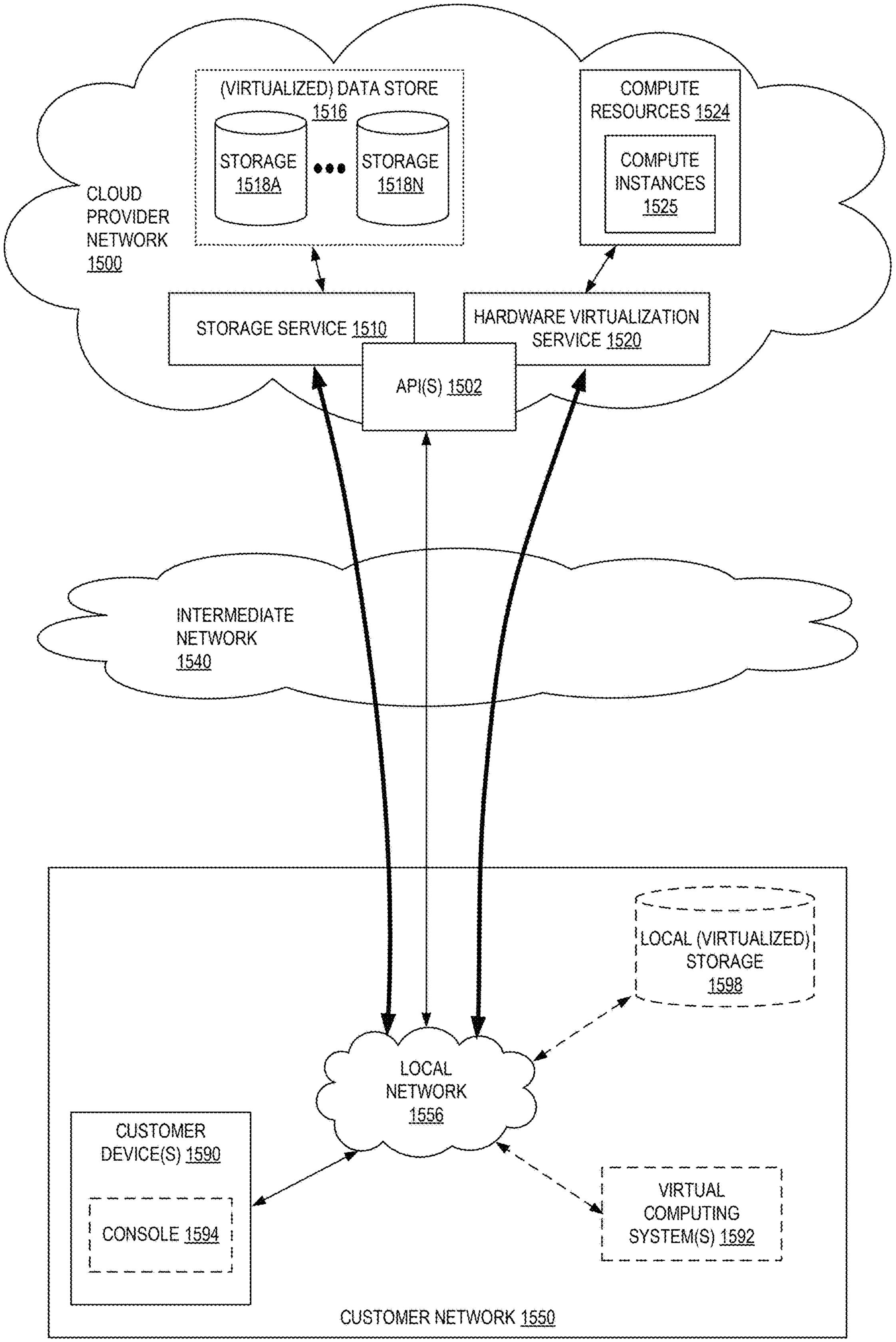
FIG. 15 is a block diagram of an example cloud provider network that provides a storage service and a hardware virtualization service to customers according to some examples.

FIG. 15 is a block diagram of an example provider network environment that provides a storage service and a hardware virtualization service to customers, according to some examples. A hardware virtualization service 1520 provides multiple compute resources 1524 (e.g., compute instances 1525, such as VMs) to customers. The compute resources 1524 can, for example, be provided as a service to customers of a provider network 1500 (e.g., to a customer that implements a customer network 1550). Each computation resource 1524 can be provided with one or more local IP addresses. The provider network 1500 can be configured to route packets from the local IP addresses of the compute resources 1524 to public Internet destinations, and from public Internet sources to the local IP addresses of the compute resources 1524.

The provider network 1500 can provide the customer network 1550, for example coupled to an intermediate network 1540 via a local network 1556, the ability to implement virtual computing systems 1592 via the hardware virtualization service 1520 coupled to the intermediate network 1540 and to the provider network 1500. In some examples, the hardware virtualization service 1520 can provide one or more APIs 1502, for example a web services interface, via which the customer network 1550 can access functionality provided by the hardware virtualization service 1520, for example via a console 1594 (e.g., a web-based application, standalone application, mobile application, etc.) of a customer device 1590. In some examples, at the provider network 1500, each virtual computing system 1592 at the customer network 1550 can correspond to a computation resource 1524 that is leased, rented, or otherwise provided to the customer network 1550.

From an instance of the virtual computing system(s) 1592 and/or another customer device 1590 (e.g., via console 1594), the customer can access the functionality of a storage service 1510, for example via the one or more APIs 1502, to access data from and store data to storage resources 1518A-1518N of a virtual data store 1516 (e.g., a folder or "bucket," a virtualized volume, a database, etc.) provided by the provider network 1500. In some examples, a virtualized data store gateway (not shown) can be provided at the customer network 1550 that can locally cache at least some data, for example frequently accessed or critical data, and that can communicate with the storage service 1510 via one or more communications channels to upload new or modified data from a local cache so that the primary store of data (the virtualized data store 1516) is maintained. In some examples, a user, via the virtual computing system 1592 and/or another customer device 1590, can mount and access virtual data store 1516 volumes via the storage service 1510 acting as a storage virtualization service, and these volumes can appear to the user as local (virtualized) storage 1598.

While not shown in FIG. 15, the virtualization service(s) can also be accessed from resource instances within the provider network 1500 via the API(s) 1502. For example, a customer, appliance service provider, or other entity can access a virtualization service from within a respective virtual network on the provider network 1500 via the API(s) 1502 to request allocation of one or more resource instances within the virtual network or within another virtual network.

Illustrative Systems

Figure 16:
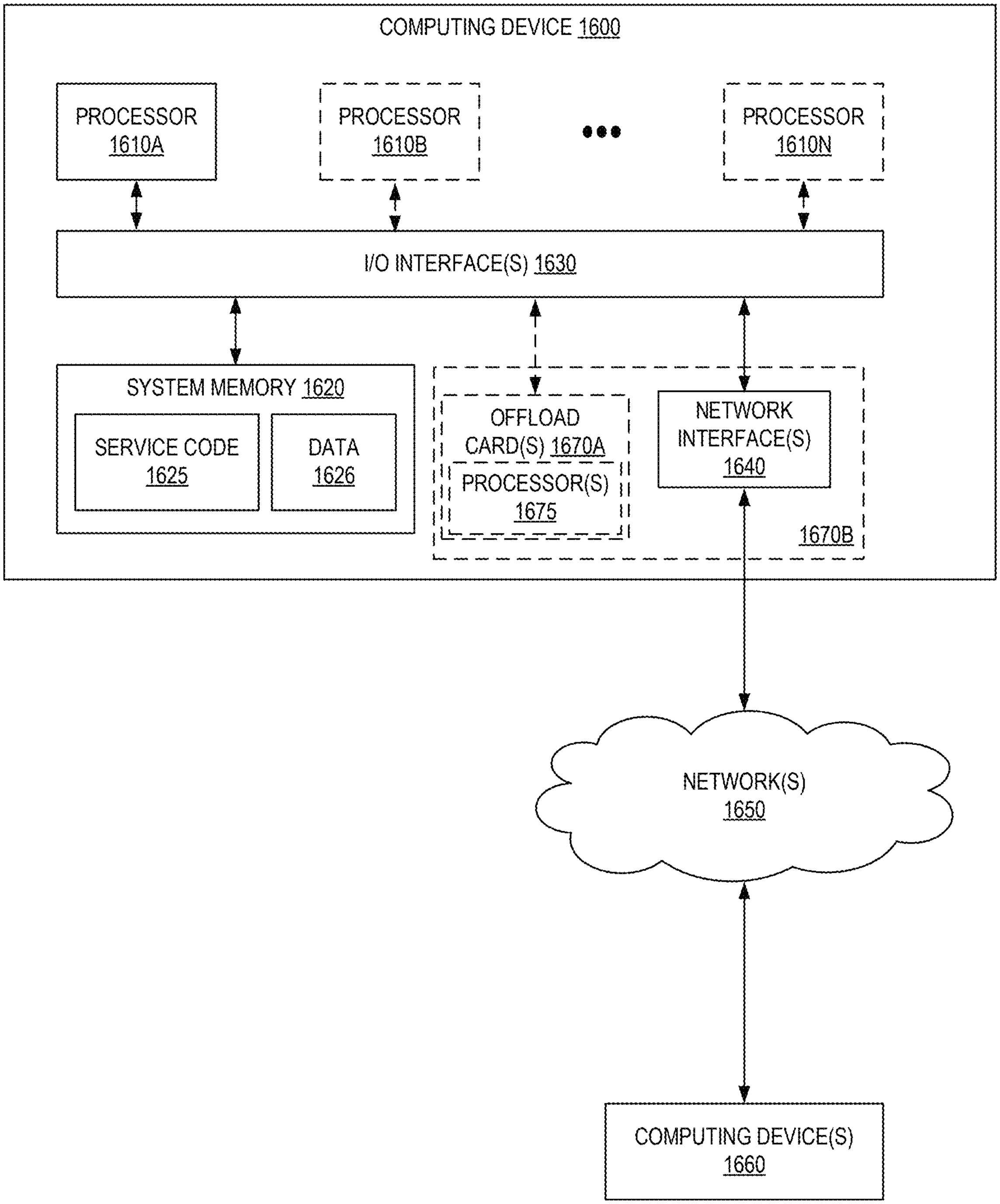
FIG. 16 is a block diagram illustrating an example computing device that can be used in some examples.

In some examples, a system that implements a portion or all of the techniques described herein can include a general-purpose computer system, such as the computing device 1600 (also referred to as a computing system or electronic device) illustrated in FIG. 16, that includes, or is configured to access, one or more computer-accessible media. In the illustrated example, the computing device 1600 includes one or more processors 1610 coupled to a system memory 1620 via an input/output (I/O) interface 1630. The computing device 1600 further includes a network interface 1640 coupled to the I/O interface 1630. While FIG. 16 shows the computing device 1600 as a single computing device, in various examples the computing device 1600 can include one computing device or any number of computing devices configured to work together as a single computing device 1600.

In various examples, the computing device 1600 can be a uniprocessor system including one processor 1610, or a multiprocessor system including several processors 1610 (e.g., two, four, eight, or another suitable number). The processor(s) 1610 can be any suitable processor(s) capable of executing instructions. For example, in various examples, the processor(s) 1610 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1610 can commonly, but not necessarily, implement the same ISA.

The system memory 1620 can store instructions and data accessible by the processor(s) 1610. In various examples, the system memory 1620 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1620 as service code 1625 (e.g., executable to implement, in whole or in part, the managed compute service or portions thereof, such as the control plane 122) and data 1626.

In some examples, the I/O interface 1630 can be configured to coordinate I/O traffic between the processor 1610, the system memory 1620, and any peripheral devices in the device, including the network interface 1640 and/or other peripheral interfaces (not shown). In some examples, the I/O interface 1630 can perform any necessary protocol, timing, or other data transformations to convert data signals from one component (e.g., the system memory 1620) into a format suitable for use by another component (e.g., the processor 1610). In some examples, the I/O interface 1630 can include support for devices attached through various types of peripheral buses, such as a variant of the Peripheral Component Interconnect (PCI) bus standard or the Universal Serial Bus (USB) standard, for example. In some examples, the function of the I/O interface 1630 can be split into two or more separate components, such as a north bridge and a south bridge, for example. Also, in some examples, some or all of the functionality of the I/O interface 1630, such as an interface to the system memory 1620, can be incorporated directly into the processor 1610.

The network interface 1640 can be configured to allow data to be exchanged between the computing device 1600 and other computing devices 1660 attached to a network or networks 1650, such as other computer systems or devices as illustrated in FIG. 1, for example. In various examples, the network interface 1640 can support communication via any suitable wired or wireless general data networks, such as types of Ethernet network, for example. Additionally, the network interface 1640 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1600 includes one or more offload cards 1670A or 1670B (including one or more processors 1675, and possibly including the one or more network interfaces 1640) that are connected using the I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1600 can act as a host electronic device (e.g., operating as part of a hardware virtualization service) that hosts compute resources such as compute instances, and the one or more offload cards 1670A or 1670B execute a virtualization manager that can manage compute instances that execute on the host electronic device. As an example, in some examples the offload card(s) 1670A or 1670B can perform compute instance management operations, such as pausing and/or un-pausing compute instances, launching and/or terminating compute instances, performing memory transfer/copying operations, etc. These management operations can, in some examples, be performed by the offload card(s) 1670A or 1670B in coordination with a hypervisor (e.g., upon a request from a hypervisor) that is executed by the other processors 1610A-1610N of the computing device 1600. However, in some examples the virtualization manager implemented by the offload card(s) 1670A or 1670B can accommodate requests from other entities (e.g., from compute instances themselves), and can not coordinate with (or service) any separate hypervisor.

In some examples, the system memory 1620 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1600 via the I/O interface 1630. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1600 as the system memory 1620 or another type of memory. Further, a computer-accessible medium can include transmission media or signals such as electrical, electromagnetic, or digital signals, conveyed via a communication medium such as a network and/or a wireless link, such as can be implemented via the network interface 1640.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1518A-1518N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

generating, by a managed compute service of a cloud provider network, a schedule including a plurality of blocks of compute capacity hosted by the managed compute service that are available to be reserved by users of the managed compute service, wherein each of the blocks corresponds to compute capacity for a number of compute instances, of a type providing access to graphics processing unit (GPU) processing resources, for a window of time;

receiving, at the cloud provider network, a request originated on behalf of a user to find a capacity block, the request identifying a desired number of compute instances and an availability duration for the desired number of compute instances;

identifying, by the managed compute service based on use of the schedule, at least a first block of the plurality of blocks as providing compute capacity for the desired number of compute instances for the desired amount of time;

transmitting, by the managed compute service, a response to the request that identifies at least the first block, the response including an offering identifier associated with the first block;

receiving a request to obtain the first block as a first capacity block for the user, the request including the offering identifier;

at a beginning of the window of time corresponding to the first capacity block, updating a data store to change an ownership of the compute capacity for the first block to be associated with an account of the user; and launching one or more compute instances on behalf of the user using the compute capacity.

2. The computer-implemented method of claim 1, wherein the compute capacity for each of the plurality of blocks is selected to be located in a portion of the cloud provider network to ensure a latency characteristic for communications between the compute instances in the block is satisfied.

3. The computer-implemented method of claim 2, wherein the launching of the one or more compute instances includes utilizing a placement rule that constrains slot selection, for the one or more compute instances, to be within the portion of the network.

4. A computer-implemented method comprising:

generating, by a managed compute service of a cloud provider network, a schedule including a plurality of blocks of compute capacity hosted by the managed compute service that are available to be reserved by users of the managed compute service, wherein each of the blocks corresponds to compute capacity for a number of compute instances for a window of time;

receiving, at the cloud provider network, a request originated on behalf of a user to find a capacity block, the request identifying a desired number of compute instances and an availability duration for the desired number of compute instances;

identifying, by the managed compute service based on use of the schedule, at least a first block of the plurality of blocks as providing compute capacity for the desired number of compute instances for the desired amount of time;

transmitting, by the managed compute service, a response to the request that identifies a first capacity block associated with at least the first block;

receiving a request to obtain the first capacity block for the user; and after a beginning of the window of time corresponding to the first capacity block, launching one or more compute instances on behalf of the user.

5. The computer-implemented method of claim 4, wherein at least one of the blocks involves multiple compute instances of a type providing access to graphics processing unit (GPU) processing resources.

6. The computer-implemented method of claim 5, wherein the compute capacity for each of the plurality of blocks is selected to be located in a portion of the cloud provider network to ensure a latency characteristic for communications between the compute instances in the block is satisfied.

7. The computer-implemented method of claim 6, wherein the launching of the one or more compute instances includes utilizing a placement rule that constrains slot selection, for the one or more compute instances, to be within the portion of the network.

8. The computer-implemented method of claim 4, wherein:

the first block has a different number of compute instances than a number of compute instances of a second block; or the first block has a different size window of time than the window of time of the second block.

9. The computer-implemented method of claim 4, wherein the launching of the one or more compute instances includes:

receiving a request to launch the one or more compute instances, the request including an identifier of the first capacity block; and selecting one or more slots to launch the one or more compute instances based on the first capacity block.

10. The computer-implemented method of claim 4, wherein generating the schedule comprises:

generating demand forecasts for a plurality of block types, each block type corresponding to a different combination of compute instance count and availability duration; and placing the plurality of blocks on the schedule based at least in part on use of the demand forecasts.

11. The computer-implemented method of claim 4, further comprising:

determining to add a new block to the schedule; and replacing a second block on the schedule and a third block on the schedule with the new block, or replacing the second block with the new block and a second new block.

12. The computer-implemented method of claim 4, wherein:

the request to find the capacity block identifies an earliest start date and the identified block has a corresponding window of time that starts on or after the earliest start date; or the request to find the capacity block identifies a latest end date and the identified block has a corresponding window of time that ends on or before the latest end date.

13. The computer-implemented method of claim 4, wherein the request to find the capacity block identifies at least one of:

a type of compute instance;

a type of operating system; or a region of the cloud provider network that is to host the one or more compute instances.

14. The computer-implemented method of claim 4, further comprising:

emitting a first event indicative of a start of the first capacity block, wherein the event causes a request to be originated seeking the launching of the one or more compute instances; or emitting a second event indicative of an end or an upcoming end of the first capacity block, wherein the event causes a request to be originated seeking the termination of the one or more compute instances.

15. A system comprising:

a first one or more computing devices to host compute instances for users of a managed compute service in a multi-tenant cloud provider network; and a second one or more computing devices to implement a control plane for the managed compute service in the multi-tenant cloud provider network, the control plane including instructions that upon execution cause the control plane to:

generate a schedule including a plurality of blocks of compute capacity hosted by the managed compute service that are available to be reserved by users of the managed compute service, wherein each of the blocks corresponds to compute capacity for a number of compute instances for a window of time;

receive a request originated on behalf of a user to find a capacity block, the request identifying a desired number of compute instances and an availability duration for the desired number of compute instances;

identify, based on use of the schedule, at least a first block of the plurality of blocks as providing compute capacity for the desired number of compute instances for the desired amount of time;

transmit a response to the request that identifies a first capacity block associated with at least the first block;

receive a request to obtain the first capacity block for the user; and after a beginning of the window of time corresponding to the first capacity block, launch one or more compute instances on behalf of the user into the compute capacity.

16. The system of claim 15, wherein at least one of the blocks involves multiple compute instances of a type providing access to graphics processing unit (GPU) processing resources.

17. The system of claim 16, wherein the compute capacity for each of the plurality of blocks is selected to be located in a portion of the cloud provider network to ensure a latency characteristic for communications between the compute instances in the block is satisfied.

18. The system of claim 17, wherein to launch the one or more compute instances, the control plane is to utilize a placement rule that constrains slot selection, for the one or more compute instances, to be within the portion of the network.

19. The system of claim 15, wherein:

the first block has a different number of compute instances than a number of compute instances of a second block; or the first block has a different size window of time than the window of time of the second block.

20. The system of claim 15, wherein to generate the schedule, the control plane further includes instructions that upon execution cause the control plane to:

generate demand forecasts for a plurality of block types, each block type corresponding to a different combination of compute instance count and availability duration; and place the plurality of blocks on the schedule based at least in part on use of the demand forecasts.

* * * * *